United States Patent
Kitsuregawa et al.

(10) Patent No.: US 7,421,456 B2
(45) Date of Patent: Sep. 2, 2008

(54) METHOD AND SYSTEM FOR DATA PROCESSING WITH DATABASE REORGANIZATION FOR THE SAME

(75) Inventors: Masaru Kitsuregawa, Tokyo (JP); Kazuo Goda, Tokyo (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 11/080,648

(22) Filed: Mar. 16, 2005

(65) Prior Publication Data
US 2006/0085488 A1 Apr. 20, 2006

(30) Foreign Application Priority Data
Oct. 20, 2004 (JP) .............................. 2004-305680

(51) Int. Cl.
*G06F 17/30* (2006.01)
(52) U.S. Cl. ..................................... 707/200
(58) Field of Classification Search ................... 707/200
See application file for complete search history.

(56) References Cited

U.S. PATENT DOCUMENTS 5,742,792 A * 4/1998 Yanai et al. ................. 711/162
6,026,412 A * 2/2000 Sockut et al. ............... 707/200
6,289,357 B1 * 9/2001 Parker ....................... 707/202
6,519,613 B1 * 2/2003 Friske et al. ................ 707/200

FOREIGN PATENT DOCUMENTS

JP 2004-199497 7/2004
JP 2004-199498 7/2004

* cited by examiner

*Primary Examiner*—Apu Mofiz
*Assistant Examiner*—Kavita Padmanabhan
(74) *Attorney, Agent, or Firm*—Mattingly, Stanger, Malur & Brundidge, P.C.

(57) ABSTRACT

A storage system carries out database reorganization processing. In a method of reorganizing, a database which is stored in a disk drive of a storage device is reorganized. The disk drive contains a first volume where the database is stored and a second volume paired with the first volume to store a copy of the database. The reorganization method includes the steps of: making transactions from the host computer into a quiescent state; splitting the paired first volume and second volume so as to only allow the database in the first volume to be accessed; releasing the quiescent state of the transactions; reorganizing the second volume; and copying data in the second volume to the first volume to resynchronize and pair the first volume and the second volume with each other.

9 Claims, 34 Drawing Sheets

| DATABASE AREA ID (2251) | TYPE (2252) | FILE ID (2253) | BLOCK LENGTH (2254) | LOGICAL VOLUME ID (2255) | PHYSICAL DEVICE ID (LUN) (2256) | RELATIVE POSITION (LBA) (2257) |
|---|---|---|---|---|---|---|
| | DB | | | | | |
| | DB | | | | | |
| | LOG | | | | | |
| | LOG | | | | | |

DB-DISK BLOCK CONVERSION TABLE

FIG. 4

METHOD AND SYSTEM FOR DATA PROCESSING WITH DATABASE REORGANIZATION FOR THE SAME

CLAIM OF PRIORITY

The present application claims priority from Japanese application P2004-305680 filed on Oct. 20, 2004, the content of which is hereby incorporated by reference into this application.

BACKGROUND

This invention relates to a storage system that manages a database, and more specifically to a database reorganization method.

A DBMS (DataBase Management System) which manages a database is conventionally designed to raise the responsiveness of the database. On the other hand, the design of a storage space of storage or the like is such that its management is simplified as much as possible by, for example, keeping a storage space of a database in one location for a long period of time. The storage space of a DBMS gradually becomes disorganized as the system is operated for a long time. Being "disorganized" here means that the storage space has a fragmented space, an uncollected area, and a disproportioned space management configuration. The disorganized storage space lowers the responsiveness of the database, with the result that an unexpectedly large portion of the storage space is taken up.

Many existing DBMSs have software dedicated to solving disorganization of their storage space. The software defragments a fragmented space, collects an uncollected area, and makes the space management configuration better proportioned, to thereby bring the storage area back to its organized, ideal state. This processing is called "reorganization".

An administrator of such DBMSs has to remedy lowering of database responsiveness and consumption of an unexpectedly large portion of the storage space by reorganization through the periodic use of the reorganization software.

An example of DBMSs that employ dedicated reorganization software is disclosed in JP 2004-199497 A. In this DBMS, when an access request from a host computer is a write request and data requested to be written is log information which shows the contents of database processing performed on a buffer of the host computer, a conversion table which shows the association relation between logical position information recognized by the host computer and information of a physical position in a primary storage device subsystem is used to convert position information contained in the log information into information of a physical position in the primary storage device subsystem. Data in a database area of the primary storage device subsystem that is indicated by the obtained physical position information is updated to reflect the log information, and the access request is sent to a secondary storage device subsystem.

Another example of DBMSs that employ dedicated reorganization software is disclosed in JP 2004-199498 A. In this DBMS, when an access request from a host computer is a write request, it is judged whether or not data requested to be written is log information which shows the contents of database processing performed on a buffer of the host computer so that, when the data requested to be written is judged to be the log information, a conversion table which shows the association relation between logical position information recognized by the host computer through database processing and information of a physical position in a storage device subsystem is used to convert position information contained in the log information into information of a physical position in the storage device subsystem. Data in a database area of the storage device subsystem that is indicated by the obtained physical position information is updated to reflect the log information.

SUMMARY

The conventional reorganization described above has two problems.

One problem resides in that any reorganization software that is available at present needs the DBMS to stop its operation during reorganization. On the other hand, executing reorganization while the DBMS is in operation degrades the service performance significantly. The administrator of the DBMS therefore has to set numerous DBMS parameters and create a well thought out management plan before executing reorganization. This makes DBMS management difficult and results in high IT system management cost.

The other problem resides in that, with many IT systems now working 24 hours a day, side effects of reorganization, namely, service shutdown and lowering of performance, are no longer acceptable. In 24-hour systems, it is difficult to execute reorganization processing with conventional reorganization software.

This invention provides a method of reorganizing, upon request from a host computer, a database which is stored in a disk drive of a storage device, the disk drive containing a first volume where the database is stored and a second volume paired with the first volume to store a copy of the database. The reorganization method is characterized by having the steps of: making a transaction of the host computer go to a quiescent state; splitting the paired first volume and second volume so that only the database in the first volume is accessed; releasing the quiescent state of the transaction; reorganizing the second volume; and copying data in the second volume to the first volume to resynchronize and pair the first volume and the second volume with each other. The storage device stores a log of the transaction made in the database during the reorganization, and the log is reflected on the database after completion of the reorganization. In this way, a database can be reorganized without stopping processing of a database system.

This invention makes it possible to carry out database reorganization processing upon instruction from a host computer.

BRIEF DESCRIPTION OF THE DRAWINGS

FIG. 4 shows an example of a DB-disk block conversion table.

DETAILED DESCRIPTION OF THE PREFERRED EMBODIMENT

An embodiment of this invention will be described below with reference to the accompanying drawings.

Figure 1:
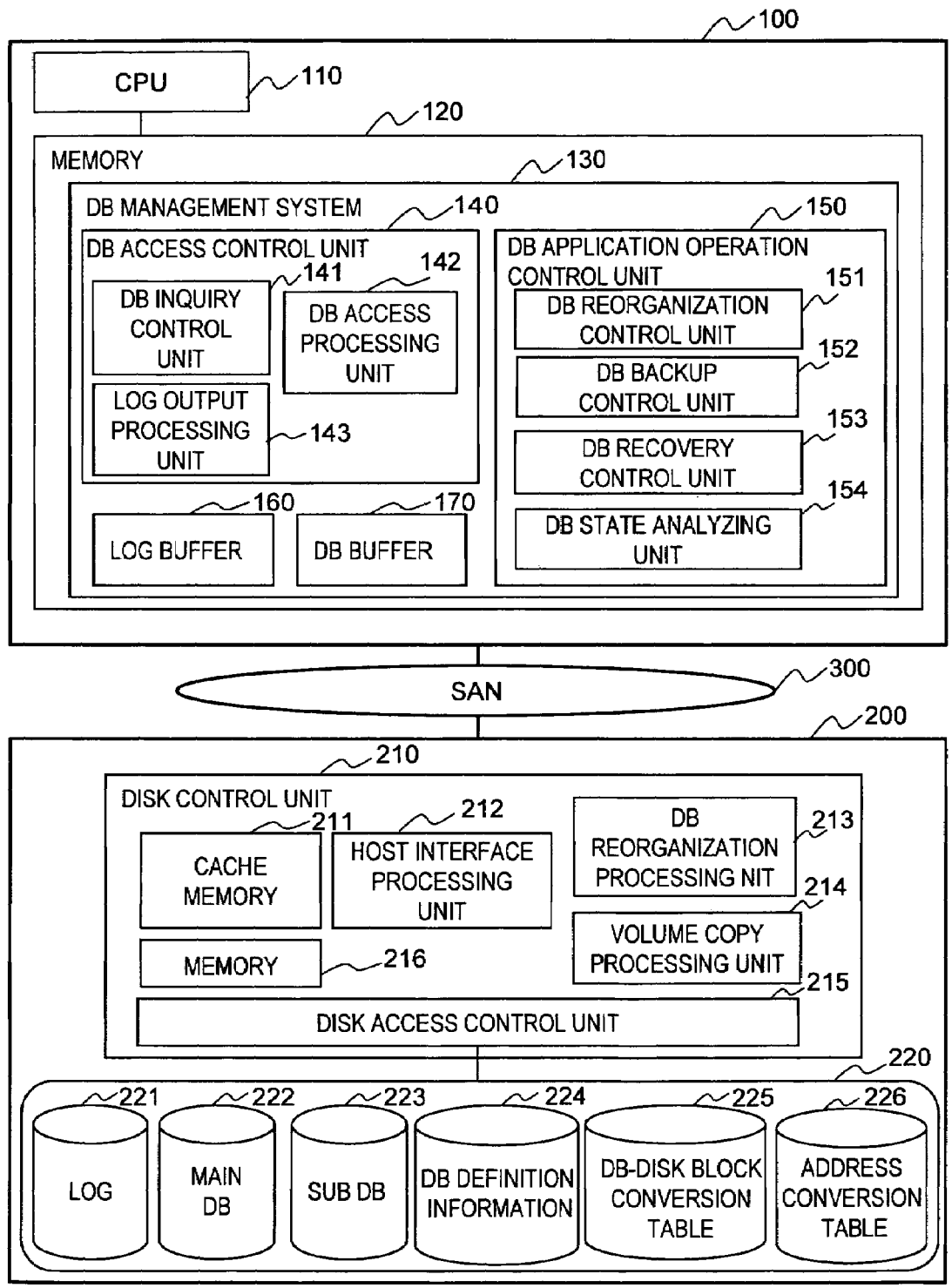
FIG. 1 is a block diagram of a database system according to this invention.

FIG. 1 is a block diagram of a database system according to this embodiment.

A host computer 100 is connected via a SAN (Storage Area Network) 300 to a storage device 200.

The host computer 100 requests via the SAN 300 a permission to manipulate data in the storage device 200. The storage device 200 sends results of the data manipulation to the host computer 100. A database system in this invention is not limited to a SAN, and can be any network as long as the host computer 100 and the storage device 200 are networked.

The host computer 100 is composed of a CPU 110, a memory 120 and other components. The CPU 110 executes various programs to control the host computer 100. The memory 120 stores a database management system 130. The DB (database) management system 130 is composed of a program. The program is executed by the CPU 110 to make the host computer 100 function as the DB management system 130.

The DB management system 130 may not be composed of software but of an object or a hardware configuration, for example. The host computer 100 may be a virtual computer.

The DB management system 130 is composed of a DB access control unit 140, a DB application operation control unit 150, a log buffer 160 and a DB buffer 170.

The DB access control unit 140 updates data in a disk drive 220 in the storage device 200 with data stored in the DB buffer 170. This updating includes storing, in the log buffer 160, log information that shows the data in the DB buffer 170, and using the stored log information to update the data in the disk drive in the storage device 200.

The DB access control unit 140 is composed of a DB inquiry control unit 141, a DB access processing unit 142 and a log output processing unit 143. The DB inquiry control unit 141 refers to a table space (index) of a database to obtain the location where the database is stored. The DB access processing unit 142 writes data in a database or reads data out of the database. The log output processing unit 143 stores a log that shows the contents of database processing in the storage device 200.

The DB application operation control unit 150 instructs the storage device 200 to perform processing related to operation of a database. Specifically, the DB application operation control unit 150 gives instructions on taking a backup of a database and performing reorganization processing on the database.

The DB application operation control unit 150 is composed of a DB reorganization control unit 151, a DB backup control unit 152, a DB recovery control unit 153 and a DB state analyzing unit 154.

The DB reorganization control unit 151 instructs the storage system 200 to perform reorganization processing, which brings a disorganized or disproportioned database space to a normal state.

The DB backup control unit 152 instructs the storage device 200 to perform processing of creating a backup of a database.

The DB recovery control unit 153 controls the recovery of a database.

The DB state analyzing unit 154 inquires of the storage device 200 about the state of a database for a database state analysis. For instance, the DB state analyzing unit 154 analyzes how much a database space is disorganized or disproportioned.

The storage device 200 is composed of a disk control unit 210 and the disk drive 220.

The disk control unit 210 controls data read and write operations in the disk drive 220.

The disk control unit 210 is composed of a cache memory 211, a host interface processing unit 212, a DB reorganization processing unit 213, a volume copy processing unit 214 and a disk access control unit 215.

The cache memory 211 temporarily stores data to be read and written in the disk drive 220.

The host interface processing unit 212 analyzes a request sent from the host computer 100 and sends the request to other processing units of the disk control unit 210. The processing unit of the disk control unit 210 to which the host interface processing unit 212 has sent the request gives a result to the host interface processing unit 212, which then sends the result to the host computer 100.

The DB reorganization processing unit 213 executes reorganization processing, which brings a disorganized or disproportioned database space in the disk drive 220 to a normal state.

The volume copy processing unit 214 controls copying between volumes, synchronizing of volumes, releasing synchronized volumes of the disk drive 220, and the like.

The disk access control unit 215 accesses the disk drive 220 under SCSI, FibreChannel, or other protocols.

The disk drive 220 is composed of one or more hard disk drives.

The plural hard disk drives are formed into a RAID configuration or the like to constitute a logical area. This area is logically partitioned into plural areas, namely, logical units (abbreviated as LU). A logical volume, which is an area where data is stored, is composed of one or more logical units.

The processing units and the control units in this embodiment may be composed of objects, programs, processes, threads, and the like. Alternatively, hardware configurations may be employed.

The disk drive 220 has plural data storing areas including a log 221, a main DB 222, a sub DB 223, DB definition information 224, a DB-disk block conversion table 225 and an address conversion table 226. The disk drive 220 in this invention is not limited to a hard disk drive, and can be any device as long as it has a function of storing data.

The log 221 stores differential logs in database processing.

The main DB 222 stores a database accessed by the host computer 100.

The sub DB 223 stores a copy of the main DB 222. While a transaction is run, the main DB 222 and the sub DB 223 are synchronized with each other. In this synchronized state, data written in the main DB 222 by the host computer 100 is also written in the sub DB 223, so that the main DB 222 and the sub DB 223 have the same data.

The DB definition information 224 contains configuration information of a database stored in the disk drive 220. Database configuration information is composed of, for example, a database name, data and index schemer of each database, and statistical information.

The DB-disk block conversion table 225 stores the association between data in a database and a physical location where the data is stored.

The address conversion table 226 is used in database reorganization processing and subsequent log catch-up processing. The address conversion table 226 stores, when there is a change in physical storing location of data in the disk drive 220 before and after reorganization processing, the physical locations of before and after.

The address conversion table 226 may be stored in an area of the memory instead of the disk drive 220.

Described next is the configuration of a database stored in the disk drive 220.

Most of data stored in the disk drive 220 is either "table data", which is the main body of the database, or "index data", which is used to retrieve and view the table data.

Figure 2:
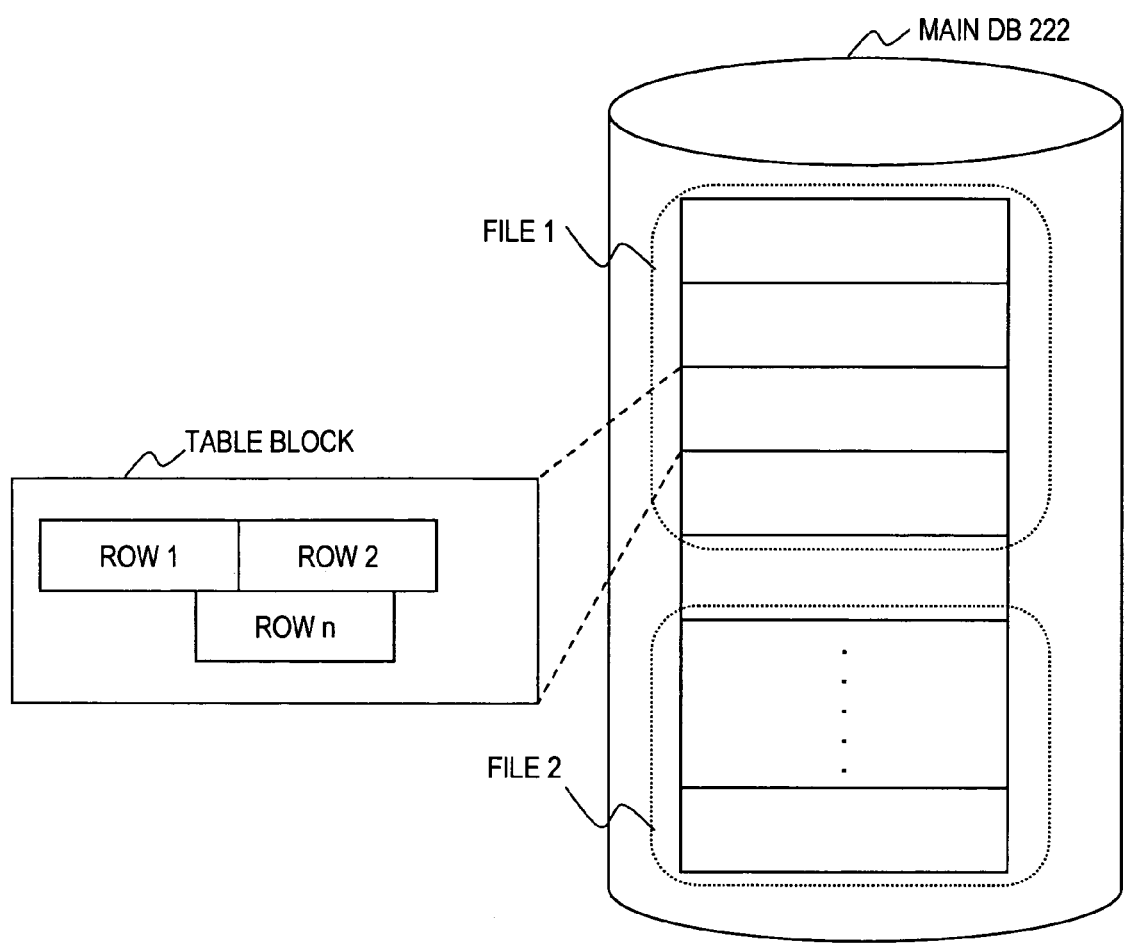
FIG. 2 is an explanatory diagram of table data.

FIG. 2 is an explanatory diagram of table data.

Table data is composed of plural table blocks. The table blocks constitute a file. Each table block contains a "row", which is the smallest structural unit of data stored.

In the example of FIG. 2, File 1 is composed of four table blocks. This file configuration is stored in the DB-disk block conversion table 225 shown in FIG. 4.

Figure 3:
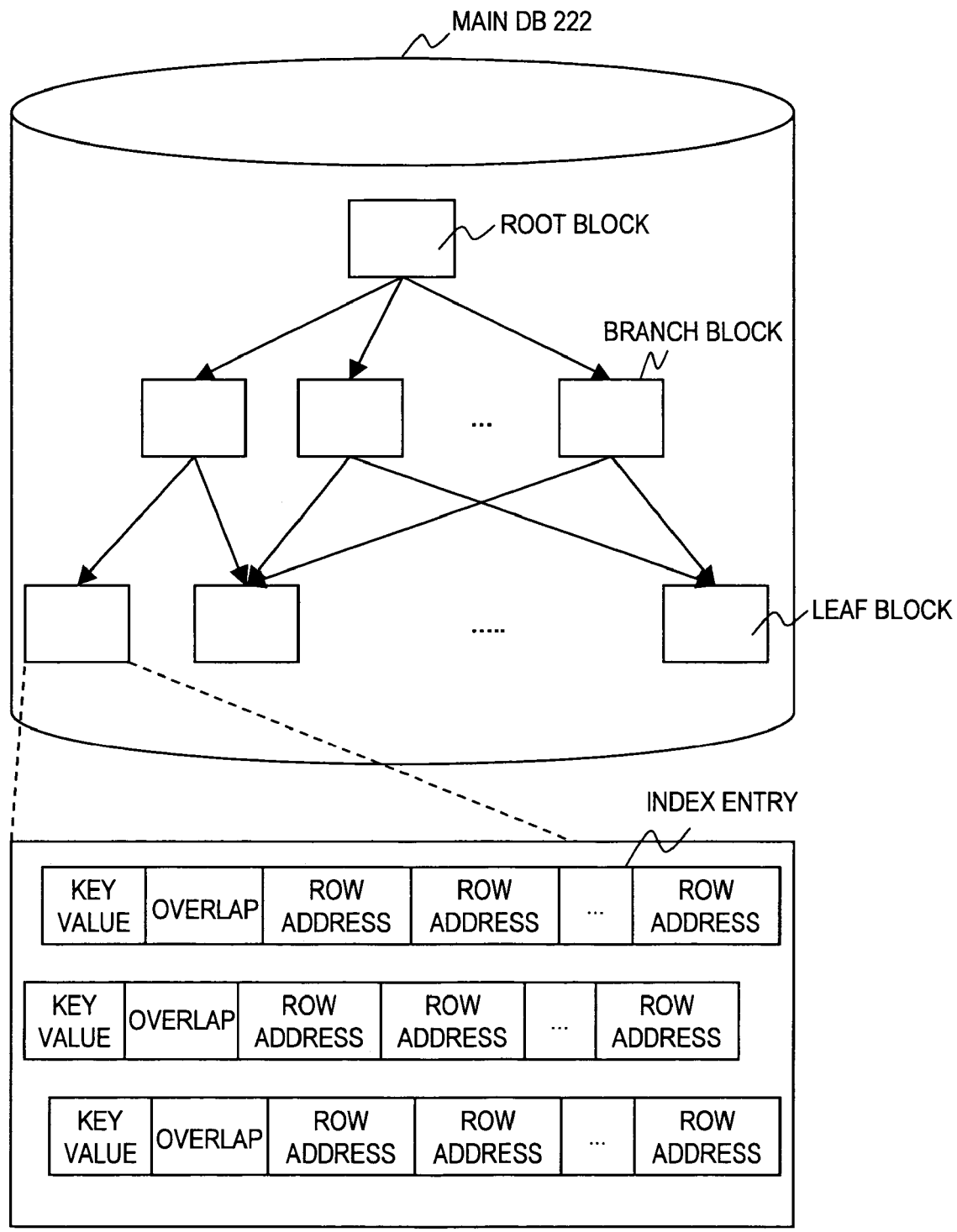
FIG. 3 is an explanatory diagram of index data.

FIG. 3 is an explanatory diagram of index data.

Index data is an aggregation of blocks, and the blocks have a tree structure.

The tree structure is composed of a root block, a branch block, and a leaf block. The root block stores the address of a branch block to be consulted. The branch block stores the address of a leaf block to be consulted. The leaf block stores an index entry. An index entry is composed of a key value, an overlap number, and a row address. Stored as a key value is an index key for retrieving data in the database. Stored as an overlap number is information indicating the number of overlapped reference sources. A row entry holds the row address of table data.

The DB management system 130 searches for index data using a retrieval key to thereby obtain the row address of table data. The obtained row address is used to access table data.

FIG. 4 shows an example of the DB-disk block conversion table 225.

The DB-disk block conversion table 225 is composed of a data base area ID 2251, a type 2252, a file ID 2253, a block length 2254, a logical volume ID 2255, a physical device ID 2256 and a relative position 2257.

The database area ID 2251 is a unique identifier given to each database area where a database is stored.

The type 2252 indicates the type of a database stored in the database area identified by the ID 2251. Stored as the type 2252 is DB (stands for database), log, or the like.

The file ID 2253 is a unique identifier given, when plural files constitute the database area indicated by the ID 2251, to each of the plural files.

The block length 2254 indicates the length (size) of table blocks that constitute the database area identified by the ID 2251.

The logical volume ID 2255 is an identifier used to identify a logical volume where a file that constitutes the database area identified by the ID 2251 is stored.

The physical device ID 2256 is an identifier used to identify a physical device where the logical volume identified by the logical volume ID 2255 is mapped out. Specifically, the physical device ID 2256 is a LUN (Logical Unit Number), which is a unique number given to each LU.

The relative position 2257 indicates where in the LU the database area identified by the ID 2251 is located using the relative position of the LU. Specifically, an LBA (Logical Block Address) is stored as the relative position 2257.

Files constituting a database in this embodiment are mapped out onto logical volumes as a file system recognized by an operating system that is run on the host computer 100. Logical volumes are mapped out as device files corresponding to the disk drive 220, which is a physical device of the storage device 200.

In the storage device 200, a device file corresponds to an LU. Therefore, files constituting database areas are ultimately mapped out onto hard disk drives of the disk drive 220 which is a physical device. Corresponding physical information is composed of a physical device ID used to identify a magnetic disk drive in the storage device 200 and an LBA which indicates the relative position in the physical device.

Figure 5:
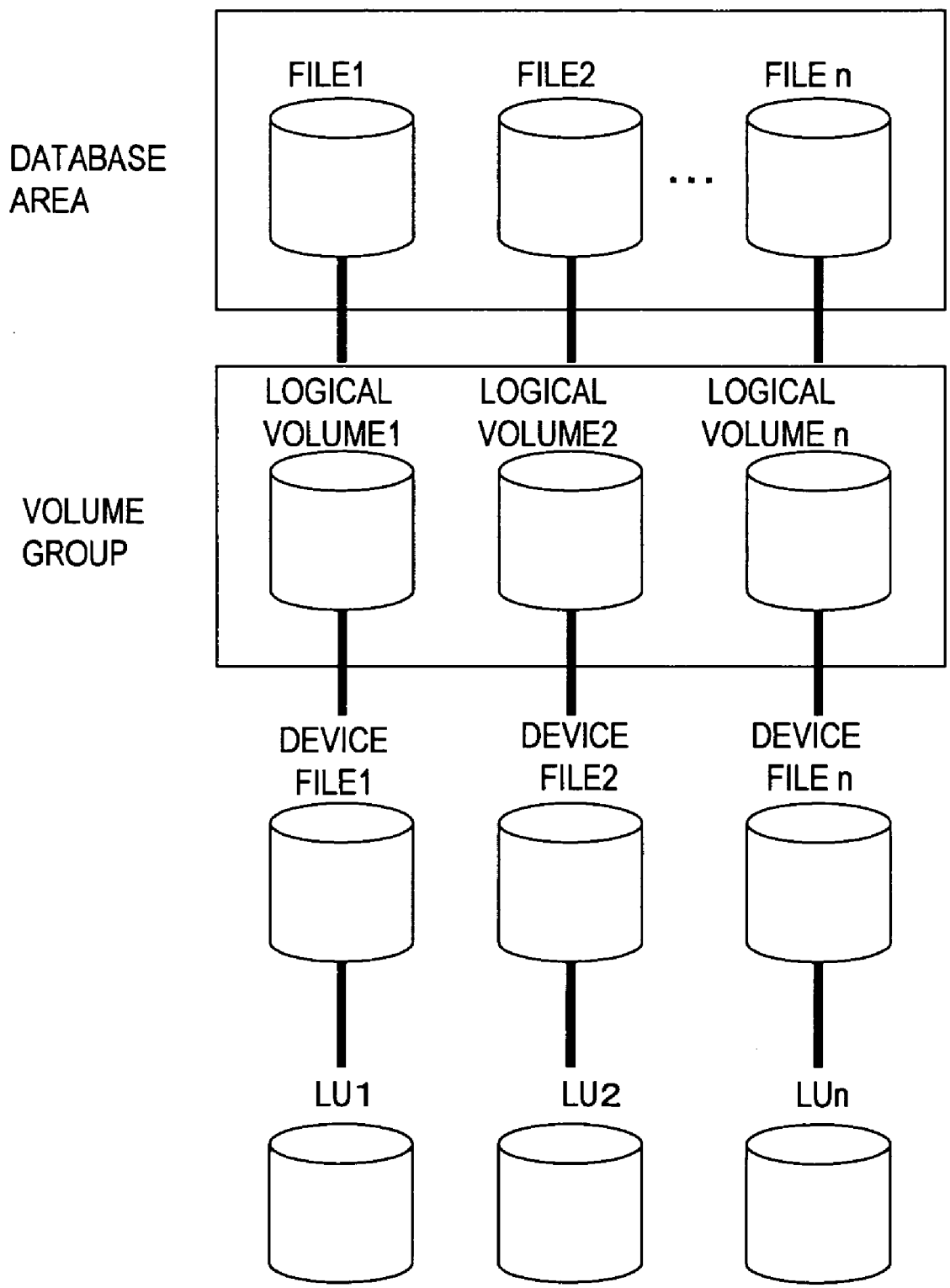
FIG. 5 is an explanatory diagram showing a mapping relation.

FIG. 5 is an explanatory diagram showing a mapping relation.

FIG. 5 shows an example of a mapping relation between database areas recognized by the host computer 100, logical volumes recognized by the operating system run on the host computer 100, device files, and LUs of the storage device 200.

The database management system 130 recognizes a database area, where a database is stored, as an aggregation of plural files. The constituent files respectively correspond to files of the operating system run on the host computer 100. In FIG. 5, it is assumed that the area is recognized as a RAW device by the operating system.

Files of the operating system are managed as device files corresponding to physical disk drives. The device files are mapped out on LUs of the storage device 200.

Processing of the database system of this embodiment is described next.

Figure 6:
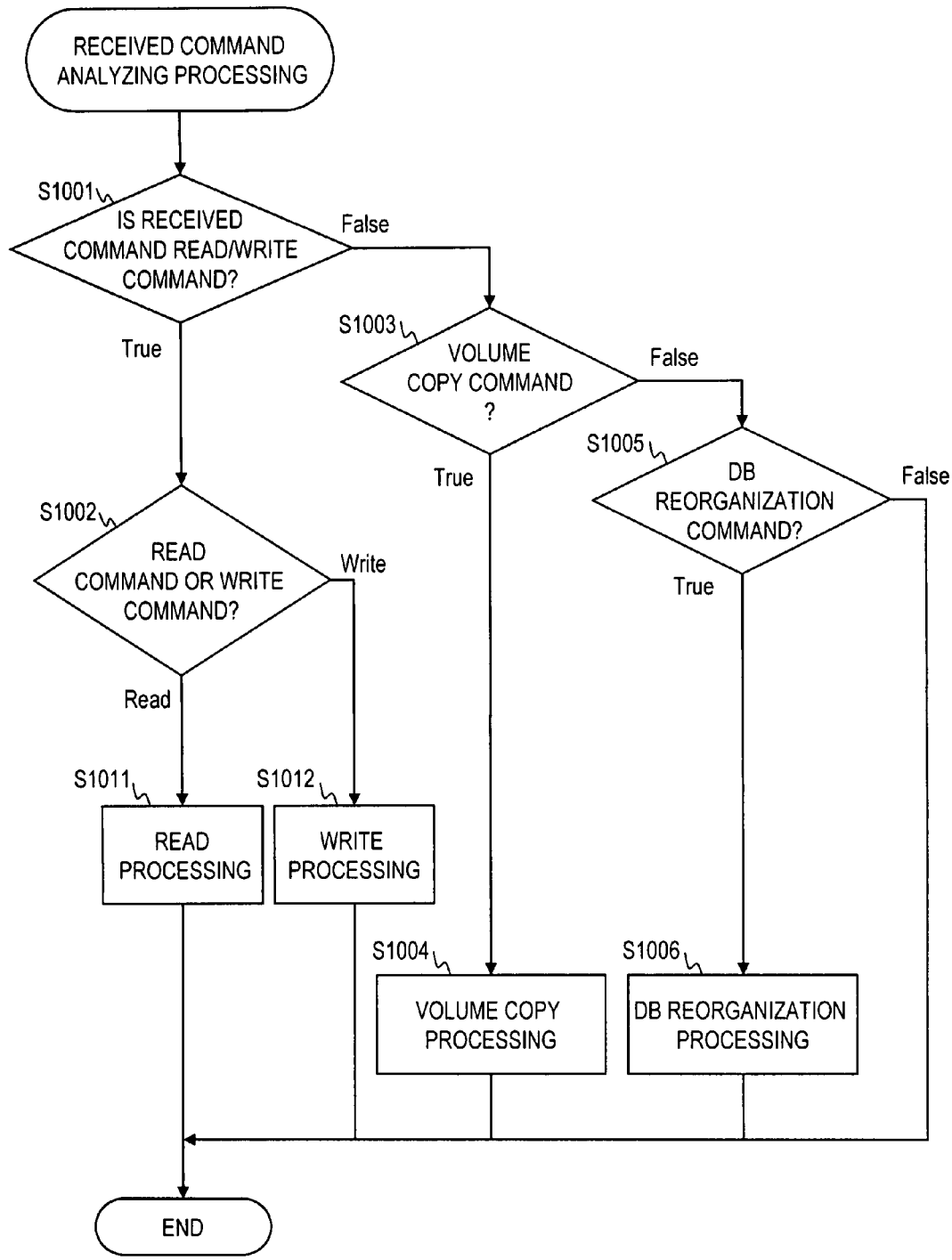
FIG. 6 is a flow chart of processing of a storage device.

FIG. 6 is a flow chart of received command analyzing processing conducted by the storage device 200.

The storage device 200 carries out this processing as requested by the host computer 100.

The host interface processing unit 212 receives a request from the host computer 100 and analyzes the contents of the request (a step S1001).

When the request from the host computer 100 is a read request (read command) or a write request (write command), the processing proceeds to a step S1002. In the step S1002, whether the request from the host computer 100 is a read command or a write command is judged.

Figure 7:
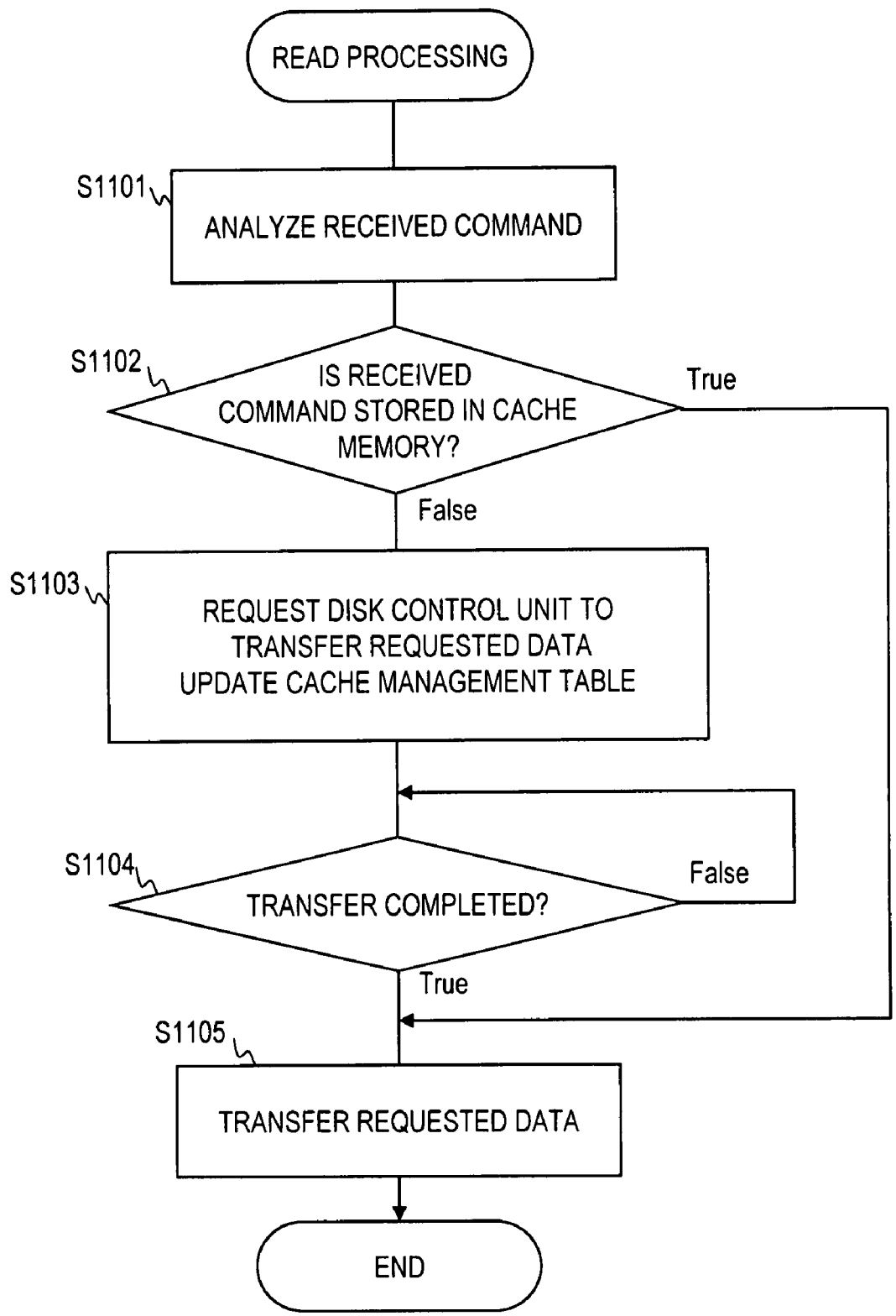
FIG. 7 is a flow chart of read processing.
Figure 8:
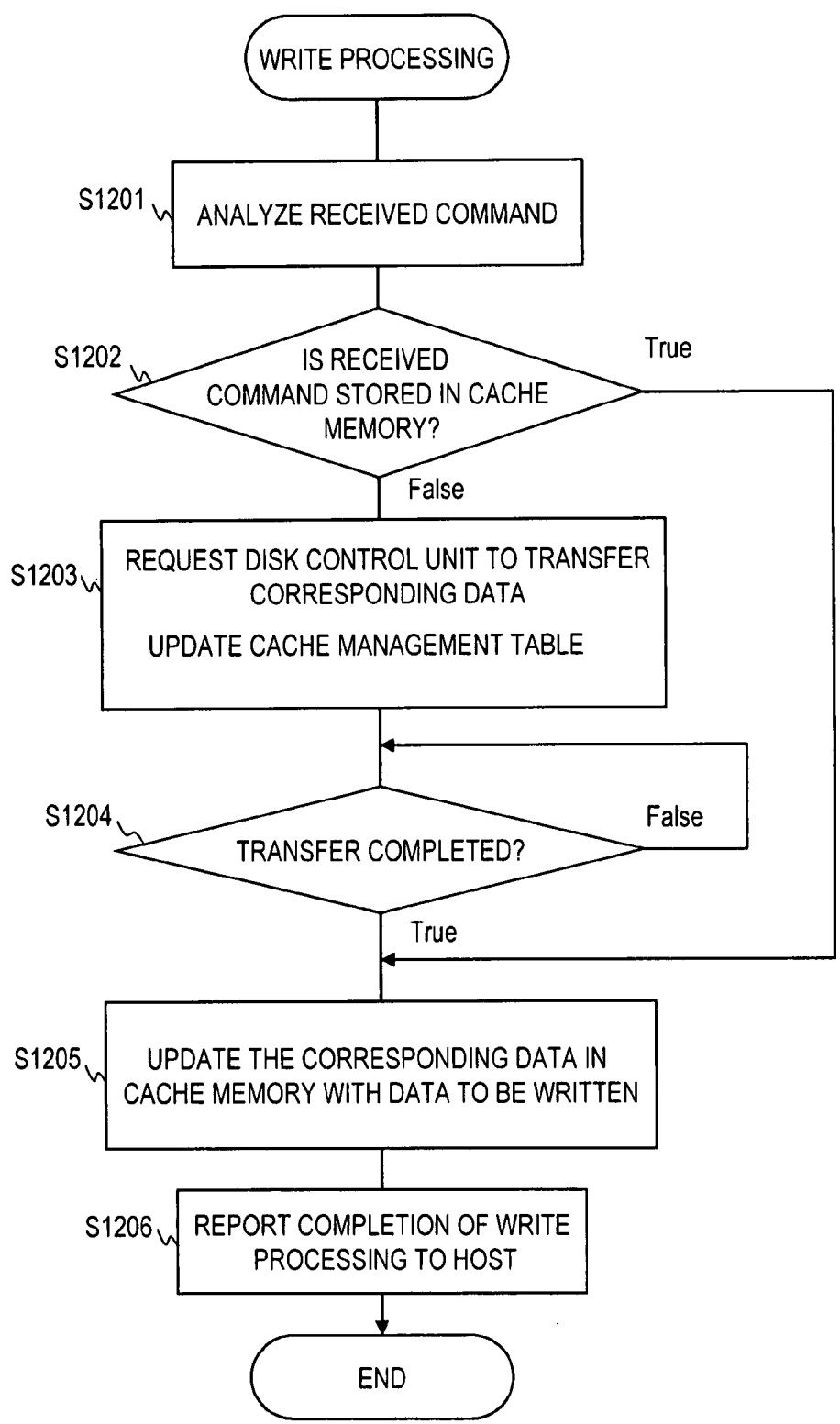
FIG. 8 is a flow chart of write processing.

When the request from the host computer 100 is judged as a read command, read processing shown in FIG. 7 is executed (a step S1011). When the request from the host computer 100 is judged as a write command, write processing shown in FIG. 8 is executed (a step S1012).

Figure 9:
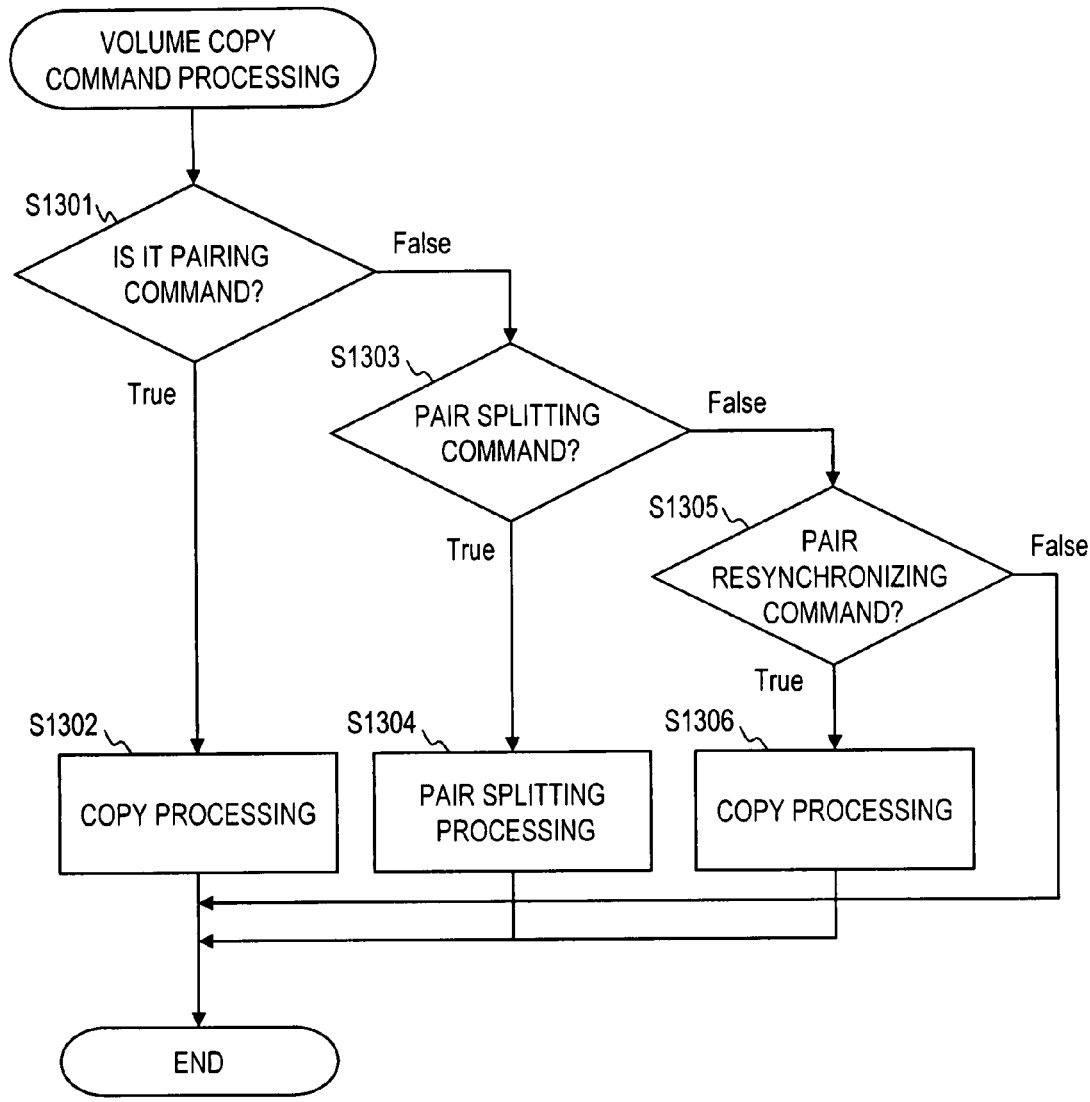
FIG. 9 is a flow chart of volume copy processing.

When the request from the host computer 100 is a volume copy command (a step S1003), volume copy processing shown in FIG. 9 is executed (a step S1004).

Figure 11:
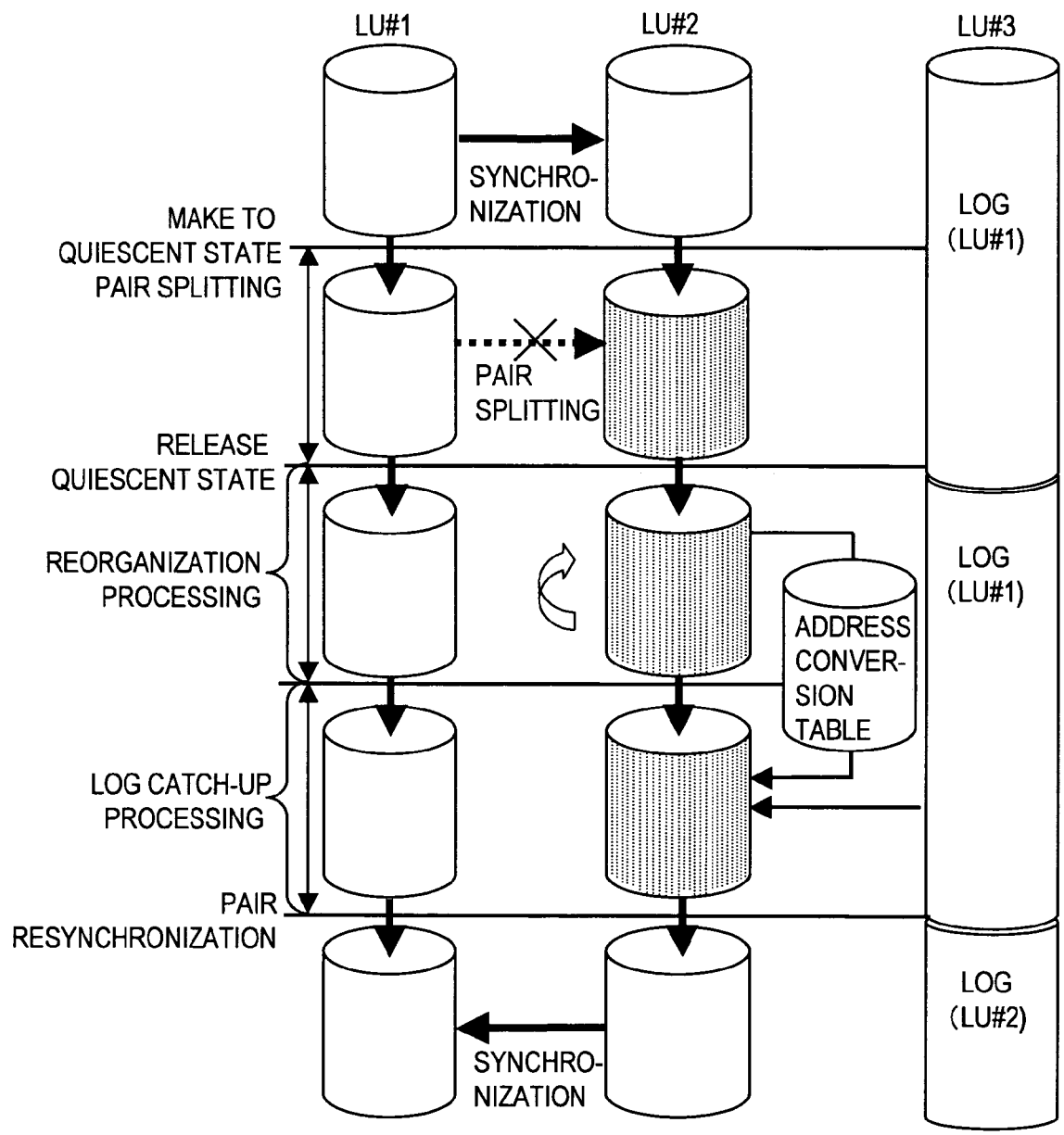
FIG. 11 is an explanatory diagram of disk drive reorganization processing.

When the request from the host computer 100 is a DB reorganization command (a step S1005), DB reorganization processing shown in FIG. 11 is executed (a step S1006).

When the request from the host computer 100 is none of the above commands, the processing is ended.

FIG. 7 is a flow chart of the read processing.

This processing is executed by the host interface processing unit 212.

First, the received command is analyzed to obtain the contents of the command and the address of data to be accessed (a step S1101).

Then it is judged whether the data to be accessed at the obtained address is stored in the cache memory 211 or not (a step S1102).

When the data is judged to be stored in the cache memory 211, the processing proceeds to a step S1105.

When the data is judged to be not stored in the cache memory 211, a transfer request to read the requested data and transfer the data to the cache memory 211 is sent to the disk access control unit 215 (a step S1103). At this point, information indicating that data at a forward address in the cache memory 211 to which the requested data is transferred is updated, and is registered in a cache management table, which is provided in the cache memory 211.

Receiving the transfer request, the disk drive 220 forwards the requested data to the cache memory 211. Then it is judged that whether the data transfer is completed or not (a step S1104).

When it is judged that the data transfer has not been completed yet, the processing stands still until completion of the data transfer. When it is judged that the data transfer has been completed, the processing proceeds to the step S1105.

In the step S1105, the requested data in the cache memory 211 is sent to the host computer 100. The processing is then terminated.

The host computer 100 obtains the requested data through the read processing.

FIG. 8 is a flow chart of the write processing.

This processing is executed by the host interface processing unit 212.

First, the received write command is analyzed to obtain the contents of the command, the address of data to be accessed, and data to be written (a step S1201).

Then it is judged whether the existing data to be accessed at the obtained address is stored in the cache memory 211 or not (a step S1202).

When the data is judged to be stored in the cache memory 211, the processing proceeds to a step S1205.

When the data is judged to be not stored in the cache memory 211, a transfer request to read the data located at the address and transfer the data to the cache memory 211 is sent to the disk access control unit 215 (a step S1203). At this point, information indicating that data at a forward address in the cache memory 211 to which the existing data is transferred is updated is registered in the cache management table of the cache memory 211.

Receiving the transfer request, the disk drive 220 forwards the data to the cache memory 211. Then it is judged that whether the data transfer is completed or not (a step S1204).

When it is judged that the data transfer has not been completed yet, the processing stands still until completion of the data transfer. When it is judged that the data transfer has been completed, the processing proceeds to the step S1205.

In the step S1205, the data that is now transferred to or has been stored from the start in the cache memory 211 is updated with the data designated by the write command to be written.

When the data update is completed, the processing proceeds to a step S1206, where a message notifying completion of the write processing is sent to the host computer 100. The processing is then terminated.

FIG. 9 is a flow chart of the volume copy processing.

This processing is executed by the host interface processing unit 212.

The host interface processing unit 212 receives a volume copy request (volume copy command) from the host computer 100 and analyzes the contents of the command to decide which of copy processing and pair splitting processing is to be chosen.

When the request from the host computer 100 is a pairing command (a step S1301), copy processing is executed (a step S1302). Specifically, all data in a logical volume is copied to another logical volume. This processing synchronizes the copy source logical volume and the copy destination logical volume with each other.

When the request from the host computer 100 is a pair splitting command (a step S1303), pair splitting processing is executed (a step S1304). Specifically, two logical volumes synchronized with each other are desynchronized.

When the request from the host computer 100 is a pair re-synchronizing command (a step S1305), volume copy processing is executed (a step S1306). This processing is the same as the one in the step S1302.

When the request from the host computer 100 is none of the above commands, the processing is ended.

Figure 10:
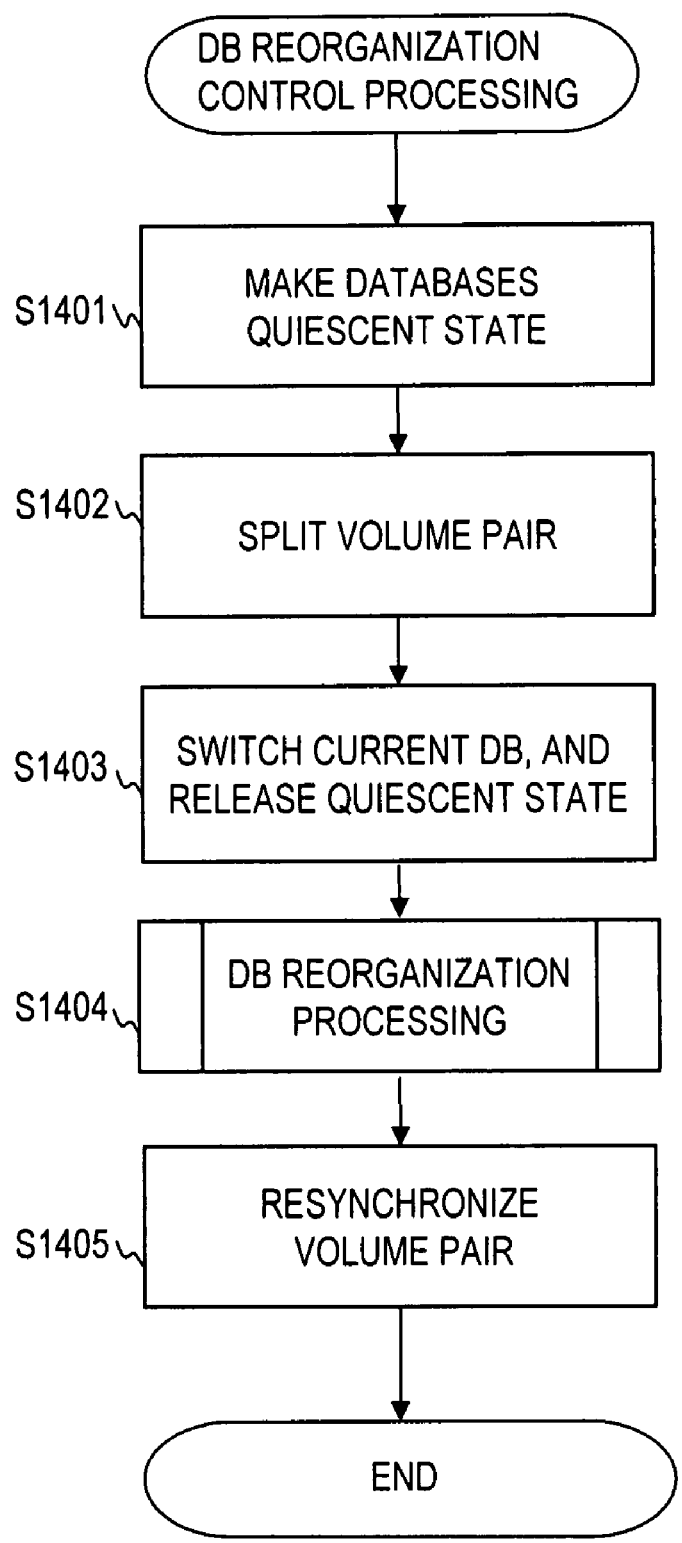
FIG. 10 is a flow chart of DB reorganization control processing.

FIG. 10 is a flow chart of DB reorganization control processing.

This processing is executed by the DB reorganization control unit 151 of the host computer 100.

At the beginning of the DB reorganization control processing, a transaction of databases to be reorganized are made to a quiescent state (a step S1401). Specifically, the DB reorganization control unit 151 requests the DB access control unit 140 to stop accepting transactions directed to the databases and finish every transaction that is being executed.

Then the volume pair is split (a step S1402). Specifically, the DB reorganization control unit 151 sends a pair splitting command to the storage device 200. With this command, the main DB 222 and the sub DB 223, which are a synchronized volume pair, are desynchronized and the volume pair is split.

Next, settings are changed so that the main DB 222 alone is a current database, which is a volume open to database processing. The databases are then released from the quiescent state (a step S1403). Specifically, the DB reorganization control unit 151 requests the DB access control unit 140 to make only main DB 222 accessible as the current database. The DB reorganization control unit 151 also requests the DB access control unit 140 to resume accepting transactions directed to the database. This processing makes the main DB 222 the only database accessed by the host computer 100.

The DB reorganization processing shown in FIG. 11 is executed next (a step S1404). Specifically, the DB reorganization control unit 151 sends a DB reorganization command to the storage device 200.

When the DB reorganization processing is completed, the split volume pair is resynchronized (a step S1405). Specifically, the DB reorganization control unit 151 sends a volume pair re-synchronizing command to the storage device 200. With this command, the main DB 222 and the sub DB 223 are resynchronized and paired with each other as a volume pair.

In the resynchronization, data of the sub DB 223, where any disorganized space and disproportioning have been eliminated by the DB reorganization processing, is copied to the main DB 222. The main DB 222 and the sub DB 223 thus share post-reorganization processing data.

The databases are reorganized through the above processing.

FIG. 11 is an explanatory diagram of disk drive reorganization processing.

This processing is executed by the DB reorganization processing unit 213.

Shown in FIG. 11 are three LUs (LU#1, LU#2 and LU#3), which are set as a main DB area, a sub DB area, and a log area, respectively.

The LU#1 and the LU#2 are synchronized with each other while an operation is run. In the synchronized state, access to the LU# 1, namely, the main DB means that the LU#2, namely, the sub DB is also accessed to store data in the LU#2 equal to data in the LU# 1. A log of the access is stored in the LU#3.

First, the databases are made into a quiescent state to stop accepting transactions. Following completion of making the databases into a thoroughly quiescent state, the LU# 1 and the LU#2 are released from synchronization by splitting the volume pair that consisted of the LU# 1 and the LU#2.

As the volume pair is split, the databases are released from the quiescent state to resume accepting transactions. At this point, settings are changed such that the LU# 1 is the only database which is accessed.

In this state, reorganization processing of the LU#2 is executed. Since the LU# 1 and the LU#2 are no longer paired with each other and out of sync with each other, the system can be run without being affected by the reorganization processing. A log of access to the LU# 1 during the reorganization processing is stored in the LU#3.

When reorganizing the LU#2 is finished, the log stored in the LU#3 is used to execute log catch-up processing.

When the log catch-up processing is completed, data in the LU# 1 which has been open to access and data in the LU#2 are now logically equivalent to each other.

Then the data in the LU#2 is copied to the LU#1 to synchronize the LU#1 with the LU#2.

Completion of the synchronization completes the reorganization processing.

Figure 12:
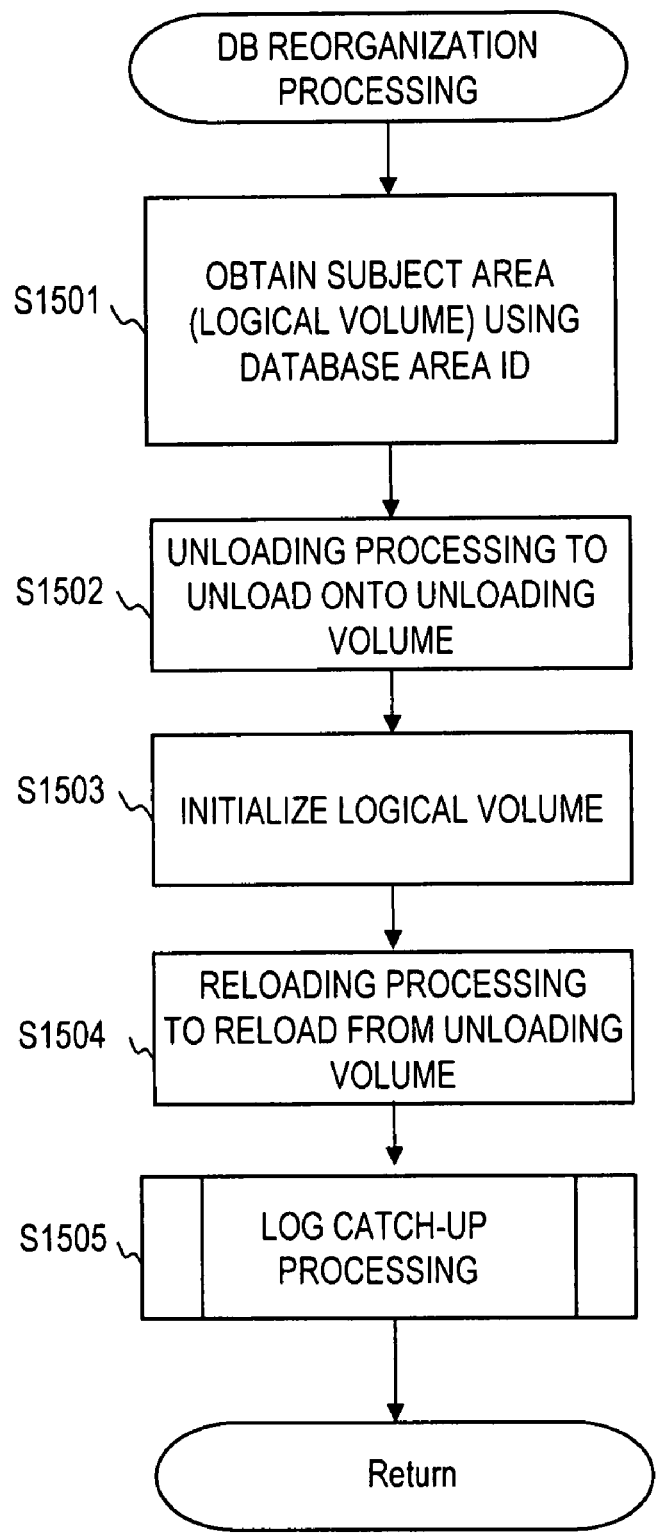
FIG. 12 is a flow chart of DB reorganization processing.

FIG. 12 is a flow chart of the DB reorganization processing.

This processing is executed by the DB reorganization processing unit 213.

First, the DB reorganization processing unit 213 obtains the database area ID of a designated database. The DB reorganization processing unit 213 refers to the DB definition information 224 and the DB-disk block conversion table 225, and obtains an identifier that indicates an area (logical volume) where this database is stored (a step S1501).

Next, the DB reorganization processing unit 213 newly creates a logical volume which has a capacity equal to (or larger than) that of the logical volume identified by the ID that has been obtained in the step S1501 (the created logical volume is hereinafter referred to as an "unloading volume"). Then the DB reorganization processing unit 213 copies data in the database logically to the created unloading volume (a step S1502). In copying data of the logical volume to the unloading volume, arrangement of pieces of data throughout the disk drive is determined in a manner that eliminates a disorganized space and disproportioning from the database.

For instance, the same table block or the same index block is stored in a physically continuous area. An objective filling ratio specified is met in storing the data in the unloading volume. The processing in the step S1502 is hereinafter referred to as unloading processing.

The unloading volume to which the data is copied through the unloading processing and the logical volume where the database is stored are logically equivalent to each other but may not always have the same physical arrangement of data pieces.

Next, the DB reorganization processing unit 213 initializes the logical volume from which the data has been copied by the unloading processing (a step S1503).

Then the DB reorganization processing unit 213 copies the data in the unloading volume to the initialized logical volume (a step S1504). In this step, unlike the copying by the unloading processing of the step S1502, the copying processing described above with reference to FIG. 9 is employed to copy the data of the unloading volume as it is.

The database is reorganized by the processing of the steps S1501 through S1504. Then the DB reorganization processing unit 213 executes log catch-up processing by which a log recorded during the database reorganization processing is reflected on the logical volume that stores the reorganized database (a step S1505). The log catch-up processing will be described later with reference to FIG. 13.

When the log catch-up processing is completed, the DB reorganization processing unit 213 sends a message notifying completion of the DB reorganization processing to the host computer 100. The transmission of the message is followed by return to the flow chart of FIG. 10.

Figure 13:
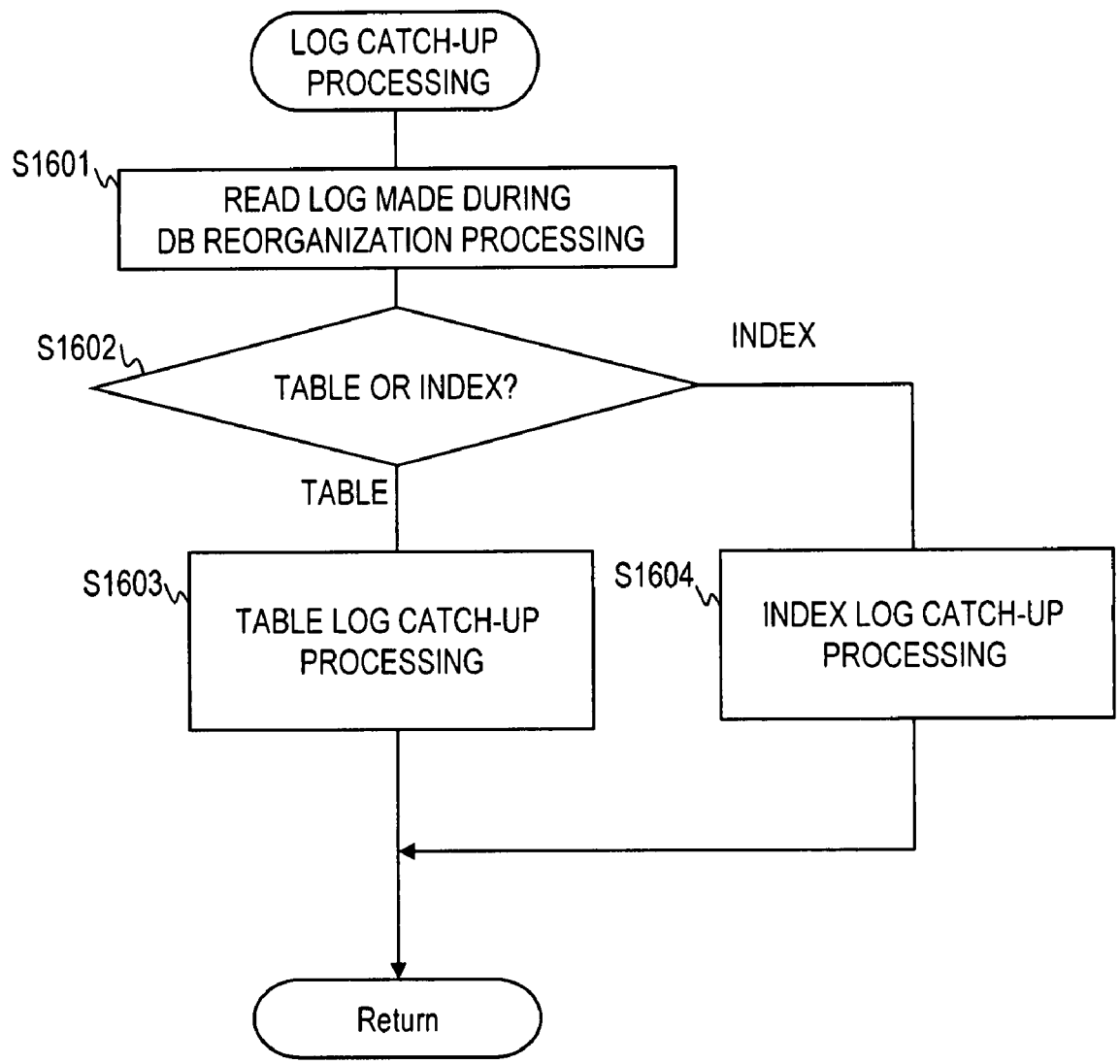
FIG. 13 is a flow chart of log catch-up processing.

FIG. 13 is a flow chart of log catch-up processing.

This processing is executed by the DB reorganization processing unit 213.

First, the DB reorganization processing unit 213 read out logs recorded while the DB reorganization processing is executed of the log 221 one at a time (a step S1601).

Next, the DB reorganization processing unit 213 judges whether the read log is table data or index data (a step S1602).

When it is judged that the read log is table data, executes table log catch-up processing (a step S1603). The table log catch-up processing will be described later with reference to FIG. 15.

When it is judged that the read log is index data, executes index log catch-up processing (a step S1604). The index log catch-up processing will be described later with reference to FIG. 24.

Actually, the index log catch-up processing is executed after the table log catch-up processing is completed, with the use of the address conversion table 225, to which an address is added by the table log catch-up processing.

Completion of the table log catch-up processing and the index log catch-up processing is followed by return to the flow chart of FIG. 11.

The description given next is about log catch-up processing.

In this embodiment, necessary ones of logs made during the reorganization processing are imported by the DB reorganization processing unit 213 and aggregated for each row address of the database. The aggregated logs are used in performing log catch-up processing on the database.

Figure 14A:
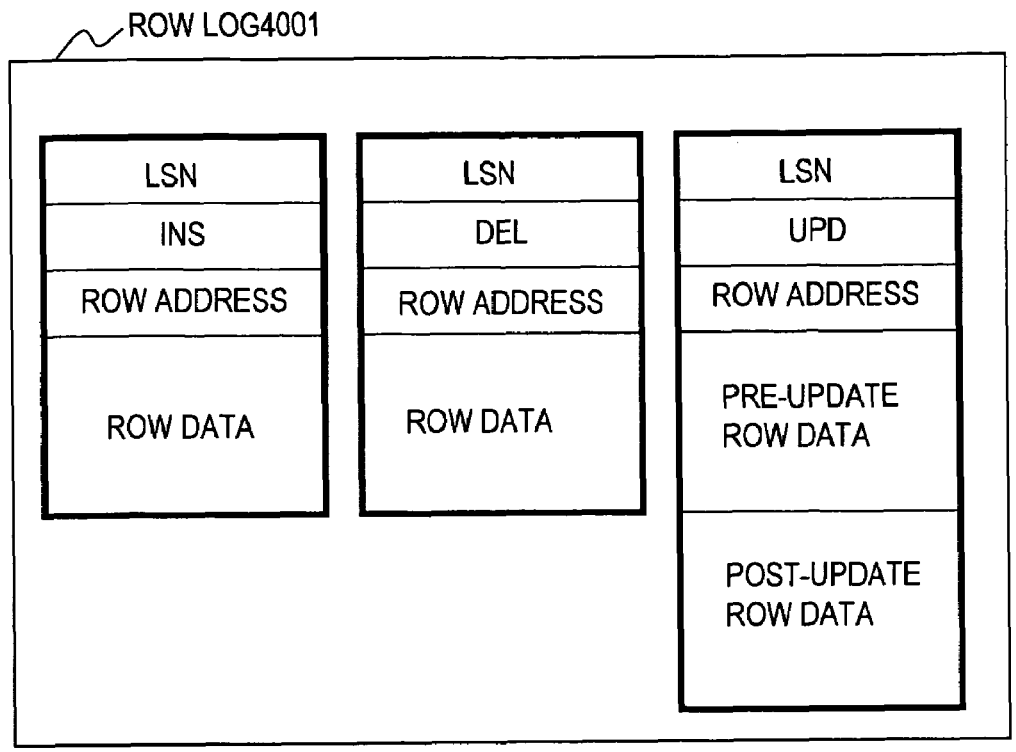
FIG. 14A is an explanatory diagram of a log imported from a log during reorganization.
Figure 14B:
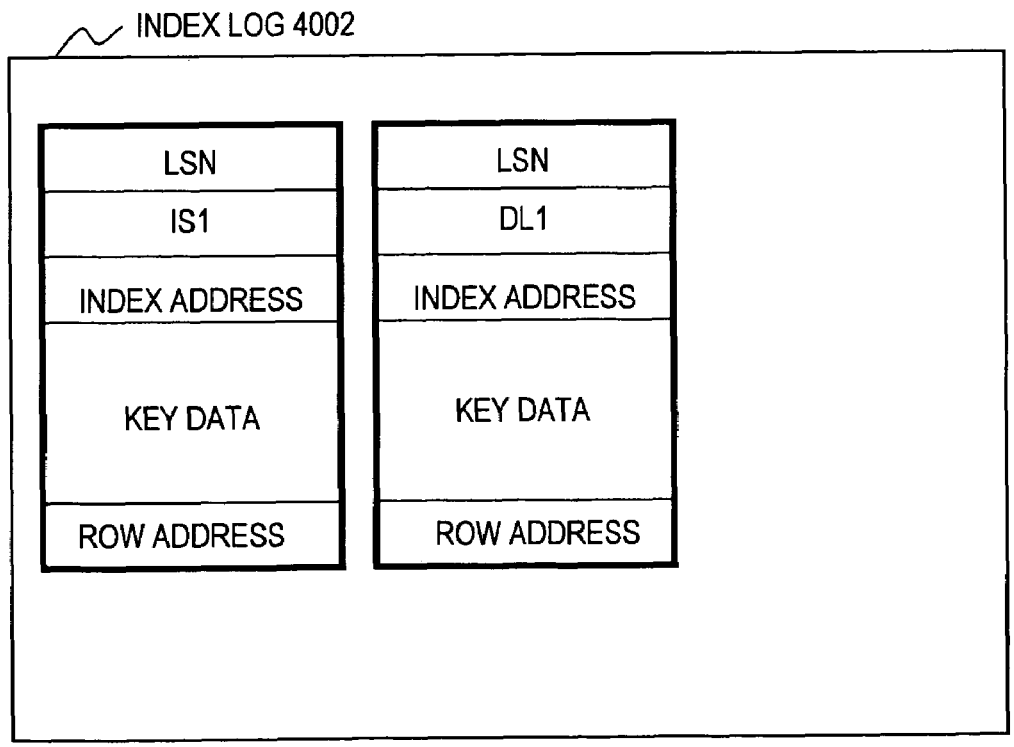
FIG. 14B is an explanatory diagram of a log imported from a log during reorganization.

FIGS. 14A and 14B are explanatory diagrams of logs imported from logs made during reorganization.

Insertion of a row, deletion of a row, and an update of a row are imported as logs for table block rows. Insertion of an index entry and deletion of an index entry are imported as logs for index entries of index blocks (index logs). The imported logs are stored in a buffer that is provided in a memory 216 of the disk control unit 210 as will be described later.

Other logs which are records of changes in database configuration, such as new block allocation, removal of a block, and partitioning of a block, do not need to be taken into consideration once the database is reorganized, and therefore are not imported.

A log about a table block row (row log 4001) is composed of a log sequence number (LSN), a log type, a row address, and row data as shown in FIG. 14A.

LSN is the number assigned to logs in the order in which the logs are recorded. An operation type of the log identified by the LSN is stored as the log type. "INS" stands for insertion. "DEL" stands for deletion. "UPD" stands for update. The row address indicates an address at which this row is stored.

Stored as row data is, when the log type is insertion, new data to be inserted. When the log type is deletion, the row data field is blank. When the log type is update, row data before an update and row data after the update are both stored.

A log about an index entry (index log 4002) is composed of a log sequence number (LSN), a log type, an index address, key data, and a row address as shown in FIG. 14B.

An operation type for an index entry is stored as the log type. "IS1" stands for insertion of an index entry. "DL1" stands for deletion of an index entry.

Stored in the key data field is, when the log type is insertion, new key data to be inserted. When the log type is deletion, the key data field is blank.

A row address of a row corresponding to this index entry is stored in the row address field.

Figure 15:
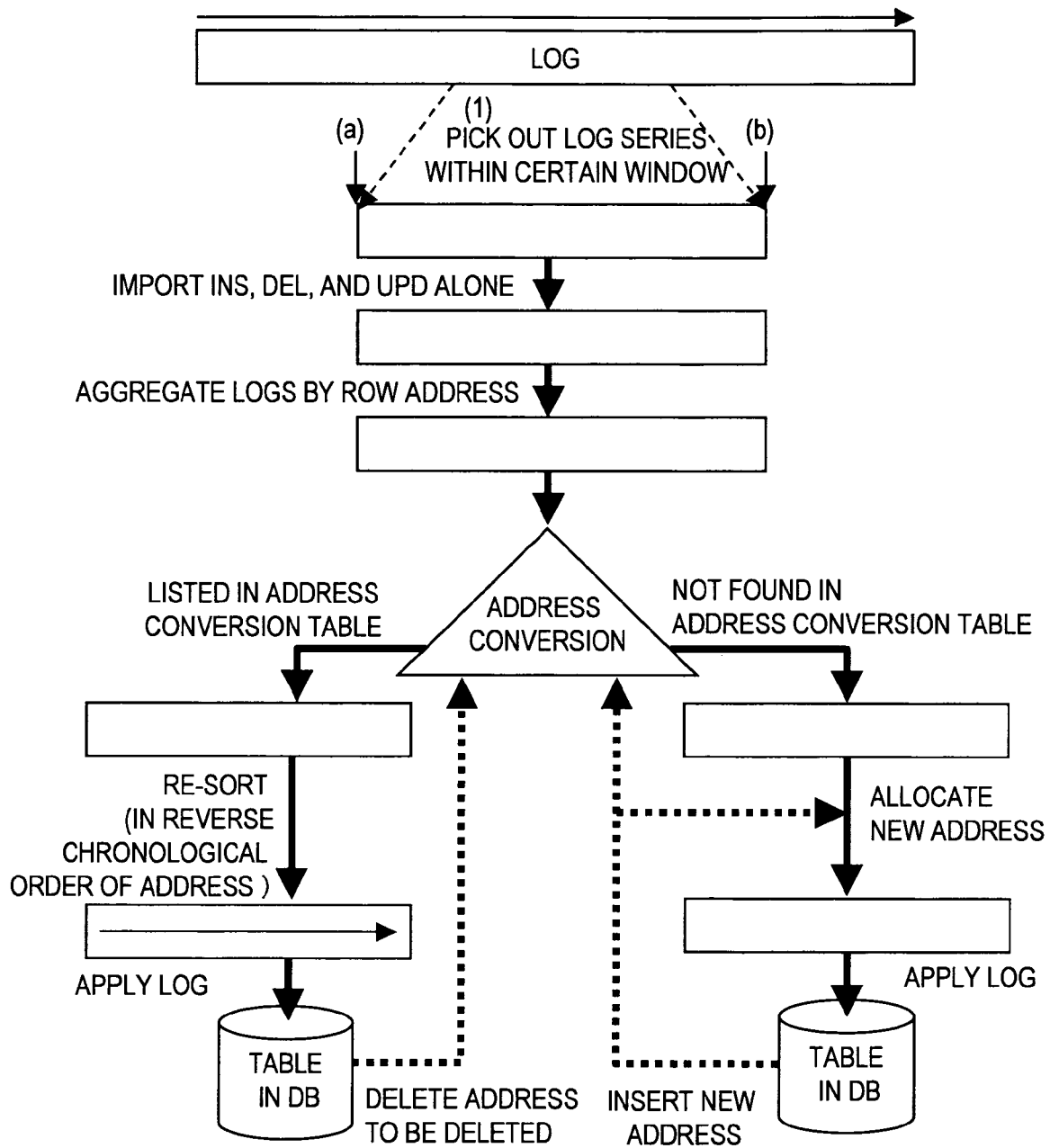
FIG. 15 is a flow chart outlining table log catch-up processing.

FIG. 15 is a flow chart outlining table log catch-up processing.

This processing is executed by the DB reorganization processing unit 213.

First, the DB reorganization processing unit 213 picks out logs recorded during reorganization processing from among other logs stored in time series.

It is necessary to take into consideration not only the logs made during the reorganization processing but also logs that are recorded during execution of the table log catch-up processing following the reorganization processing. Log catch-up processing for the logs that are recorded during the table log catch-up processing of the logs that are made during the reorganization processing can be further carried out after the table log catch-up processing is completed, or while the table log catch-up processing is performed, or at other times.

Next, the DB reorganization processing unit 213 imports insertion (INS), deletion (DEL) and update (UPD) logs from the picked-out log series.

Then the DB reorganization processing unit 213 aggregates the logs in the imported log series for each row address. Specifically, the logs in the imported log series are grouped by their row addresses and are arranged in time series for each row address. The arranged logs are converted such that logs having the same row address make one log. This log conversion will be described later with reference to FIG. 16.

The DB reorganization processing unit 213 applies the converted row logs separately for each row address. At this point, the DB reorganization processing unit 213 judges whether a row address contained in a converted log is listed in the address conversion table or not.

In the case where the row address is listed in the address conversion table, a row address after reorganization processing can be obtained by referring to the address conversion table 226.

On the other hand, in the case where the row address is not listed in the address conversion table, the raw address has not existed prior to the reorganization processing and has been inserted during the reorganization processing.

Whether a row address is listed in the address conversion table or not is judged by referring to a row address of a log.

The DB reorganization processing unit 213 executes address conversion for re-sorting by converted address when a row address is listed in the address conversion table, and executes processing indicated by a log which is an aggregation of logs. For instance, when this aggregated log is a "deletion" log, the DB reorganization processing unit 213 deletes the row having the row address of this aggregated log.

As a row address that is not listed in the address conversion table, the DB reorganization processing unit 213 inserts a new row address area and writes data in the inserted row address. The new address is recorded in the address conversion table 226.

Figure 16A:
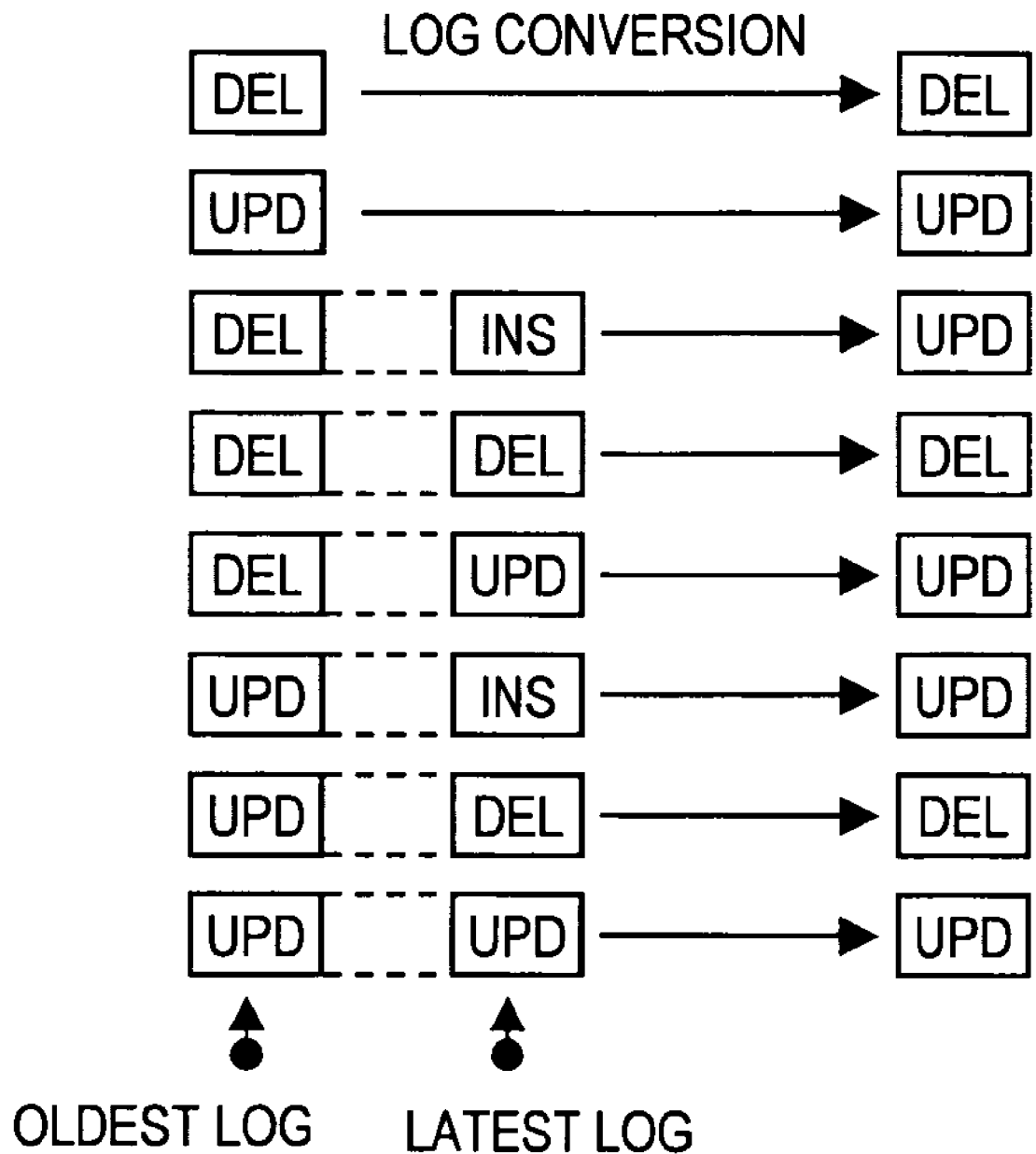
FIG. 16A is an explanatory diagram of how logs are aggregated.
Figure 16B:
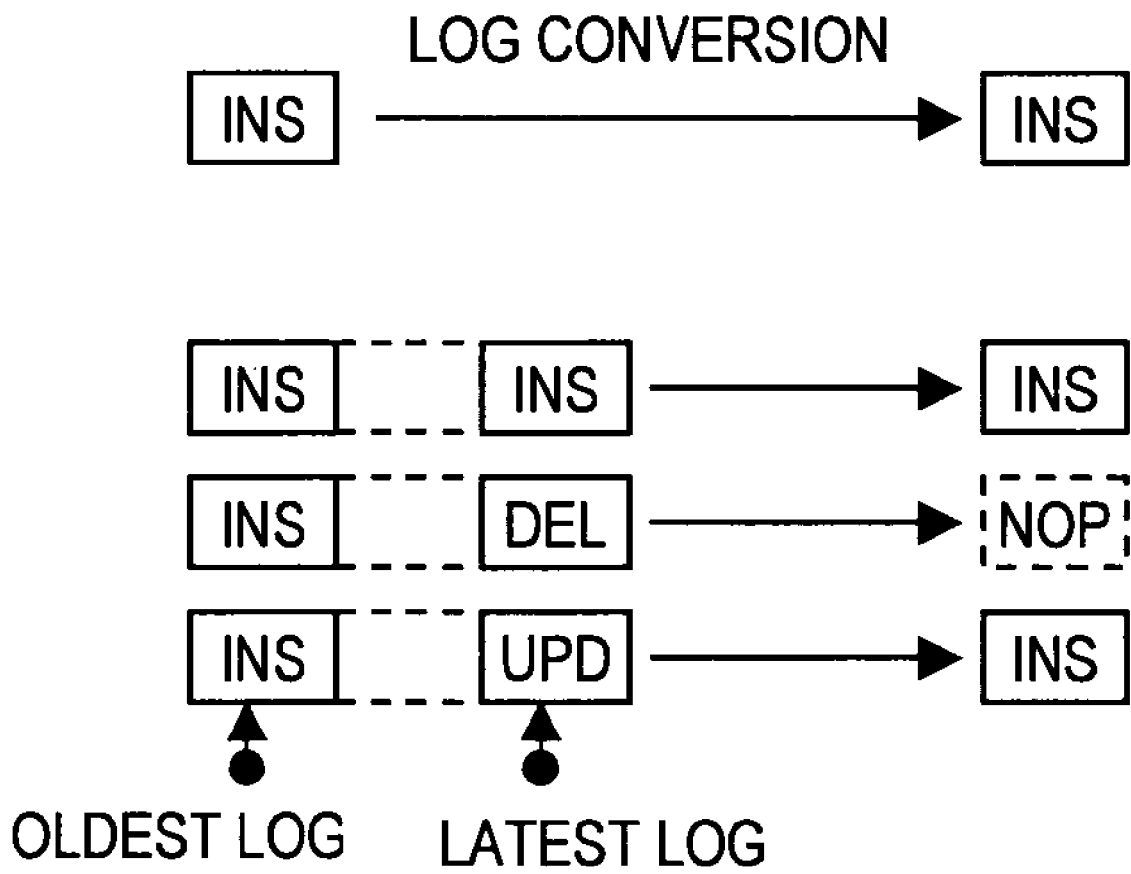
FIG. 16B is an explanatory diagram of how logs are aggregated.

FIGS. 16A and 16B are explanatory diagrams of how logs are aggregated.

In FIG. 16A, when "DEL" (deletion) or "UPD" (update) is the only operation performed on a row at an existing row address in the main DB 222, there is only a "DEL" log or a "UPD" log and no need to aggregate. Accordingly, the "DEL" log or the "UPD" log serves as the log for this row address without log conversion.

When plural logs are recorded for a row identified by a row address, the oldest (the first log recorded) and latest (the last log recorded) of the plural logs alone are picked out for log conversion.

In the case where the oldest log is a "DEL" log and the latest log is an "INS" (insertion) log, the log conversion aggregates the logs into one "UPD" log for this row address.

In the case where the oldest log is a "DEL" log and the latest log is also a "DEL" log, the log conversion aggregates the logs into one "DEL" log for this row address.

In the case where the oldest log is a "DEL" log and the latest log is a "UPD" log, the log conversion aggregates the logs into one "UPD" log for this row address.

In the case where the oldest log is a "UPD" log and the latest log is an "INS" log, the log conversion aggregates the logs into one "UPD" log for this row address.

In the case where the oldest log is a "UPD" log and the latest log is a "DEL" log, the log conversion aggregates the logs into one "DEL" log for this row address.

In the case where the oldest log is a "UPD" log and the latest log is also a "UPD" log, the log conversion aggregates the logs into one "UPD" log for this row address.

In FIG. 16B, for a row address that has not been present before reorganization processing is started, namely, a row address whose oldest log is an "INS" log, the log is changed as a log that is not listed in the address conversion table.

In this case, when "INS" is the only operation performed on the row identified by this row address, the "INS" log serves as the log for this row address without log conversion.

When plural logs are recorded for the row identified by this row address, the oldest (the first log recorded) and latest (the last log recorded) of the plural logs alone are picked out for log conversion.

In the case where the oldest log is an "INS" log and the latest log is also an "INS" log, the log conversion aggregates the logs into one "INS" log for this row address.

In the case where the oldest log is an "INS" log and the latest log is a "DEL" log, the log conversion aggregates the logs into one "NOP" (No Operation) log for this row address, meaning that no operation is performed on the row identified by this row address.

In the case where the oldest log is an "INS" log and the latest log is a "UPD" log, the log conversion aggregates the logs into one "INS" log for this row address.

Figure 17:
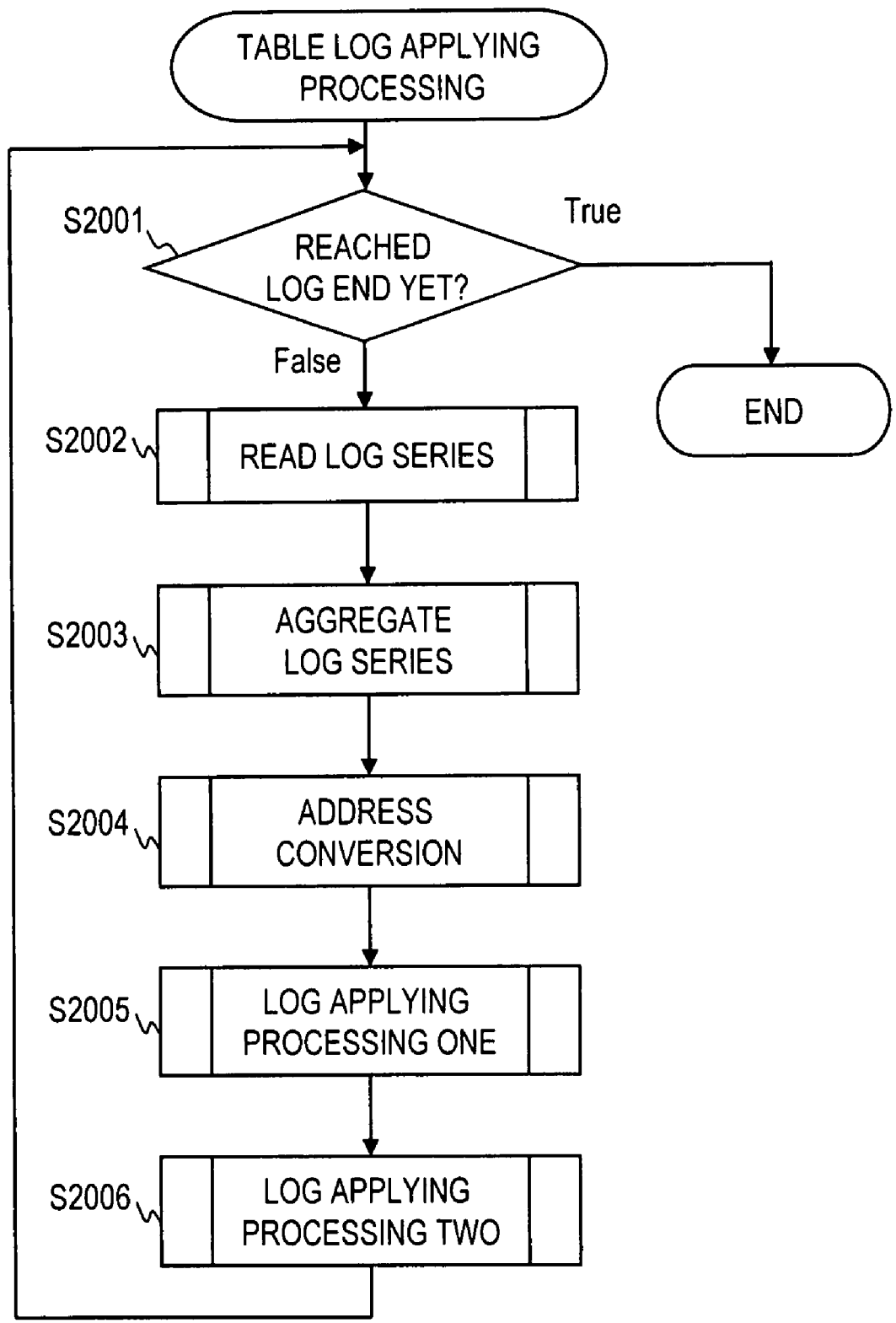
FIG. 17 is a flow chart showing table log catch-up processing.

FIG. 17 is a flow chart of table log catch-up processing.

This processing is executed by the DB reorganization processing unit 213.

First, the DB reorganization processing unit 213 judges whether a log has been read to its end or not (a step S2001).

When it is judged that the log end has been reached, the processing is terminated.

When it is judged that the log end has not been reached yet, the DB reorganization processing unit 213 executes log series reading processing (a step S2002). Through the log series reading processing, necessary logs are imported as a log series from the log 221. The imported log series are stored in the buffer A.

Next, the DB reorganization processing unit 213 executes processing of aggregating the log series stored in the buffer A (a step S2003). This processing converts the logs in the log series such that logs having the same row address make one log. The converted logs are stored in the buffer B.

Next, the DB reorganization processing unit 213 executes address conversion processing to the aggregated logs (a step S2004). Through this processing, logs that are listed in the address conversion table are discriminated from logs that are not, and row addresses before and after reorganization processing are converted according to the address conversion table 226 to be stored in different buffers (buffers C and D).

Next, the DB reorganization processing unit 213 executes Log Applying Processing One in which the logs stored in the buffer C are applied to the database table (a step S2005).

Next, the DB reorganization processing unit 213 executes Log Applying Processing Two in which the logs stored in the buffer D are applied (a step S2006).

The above processing is repeated until every log is read.

The steps S2005 and S2006 may not always be executed in the processing order shown in the flow chart. Log Applying Processing One and Log Applying Processing Two may be started as soon as the logs are stored in the buffers C and D, respectively.

The buffers A, B, C and D are provided in the memory 216 of the disk control unit 210.

Figure 18:
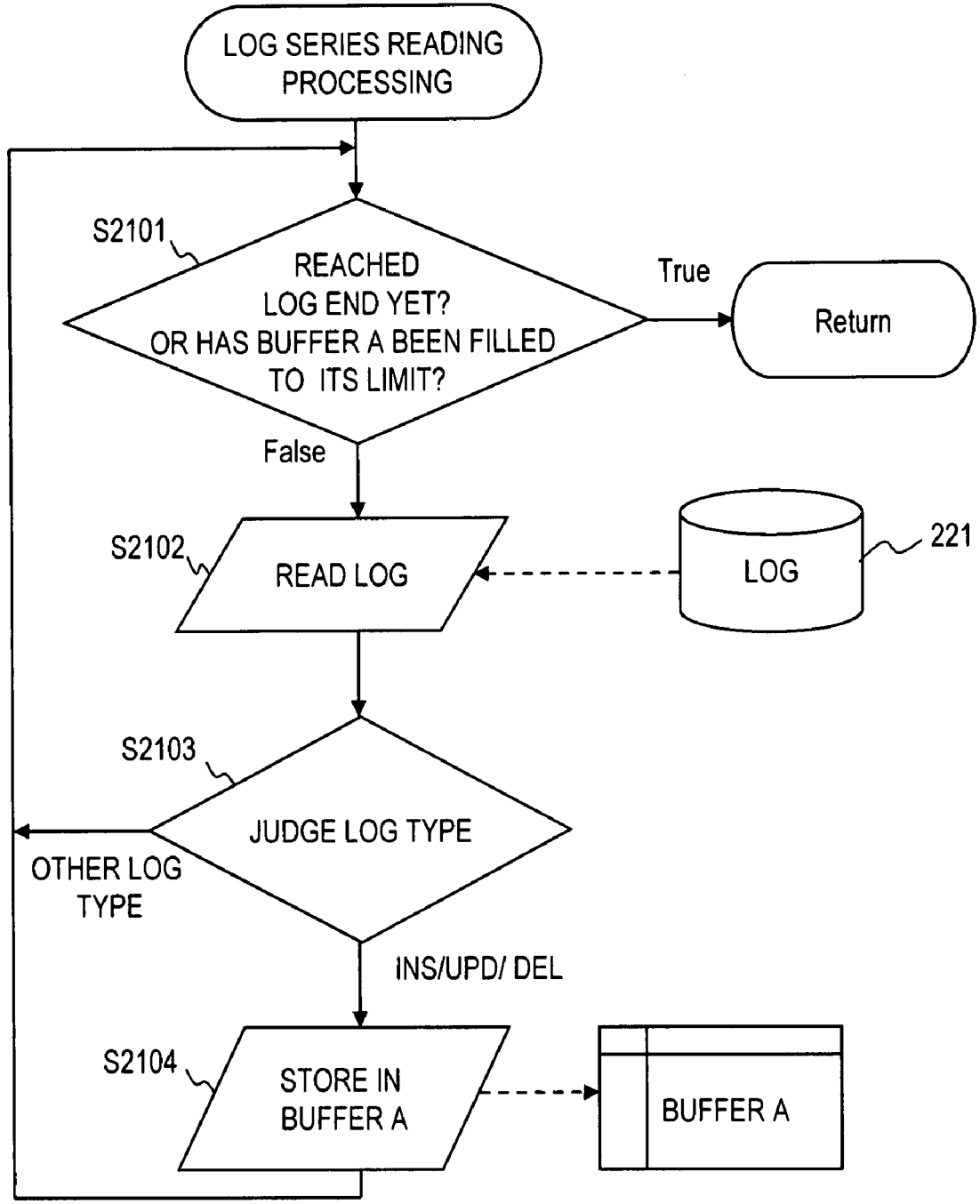
FIG. 18 is a flow chart of log reading processing.

FIG. 18 is a flow chart of the log series reading processing in the step S2002 of FIG. 17.

This processing is executed by the DB reorganization processing unit 213.

First, the DB reorganization processing unit 213 judges whether a log has been read to its end or not, or whether the buffer A has been filled with stored logs to the set limit of its capacity or not (a step S2101).

When it is judged that the log end has been reached, or that the buffer A has been filled to the limit, the next step is to return to the flow chart of FIG. 17.

On the other hand, when it is judged that the log end has not been reached yet, or that the buffer A has not been filled to the limit yet, a log recorded in the log 221 during reorganization processing is read (a step S2102).

Next, the type of the read log is determined (a step S2103). When the type of the read log is INS (insertion), UPD (update) or DEL (deletion), the processing moves to a step S2104 where this log is stored in the buffer A.

When the type of the read log is none of INS (insertion), UPD (update) and DEL (deletion), there is no need to apply the log, and the processing returns to the step S2101.

Through the log series reading processing, logs necessary for log catch-up processing, namely, INS (insertion) logs, UPD (update) logs and DEL (deletion) logs are imported and stored in the buffer A.

Figure 19:
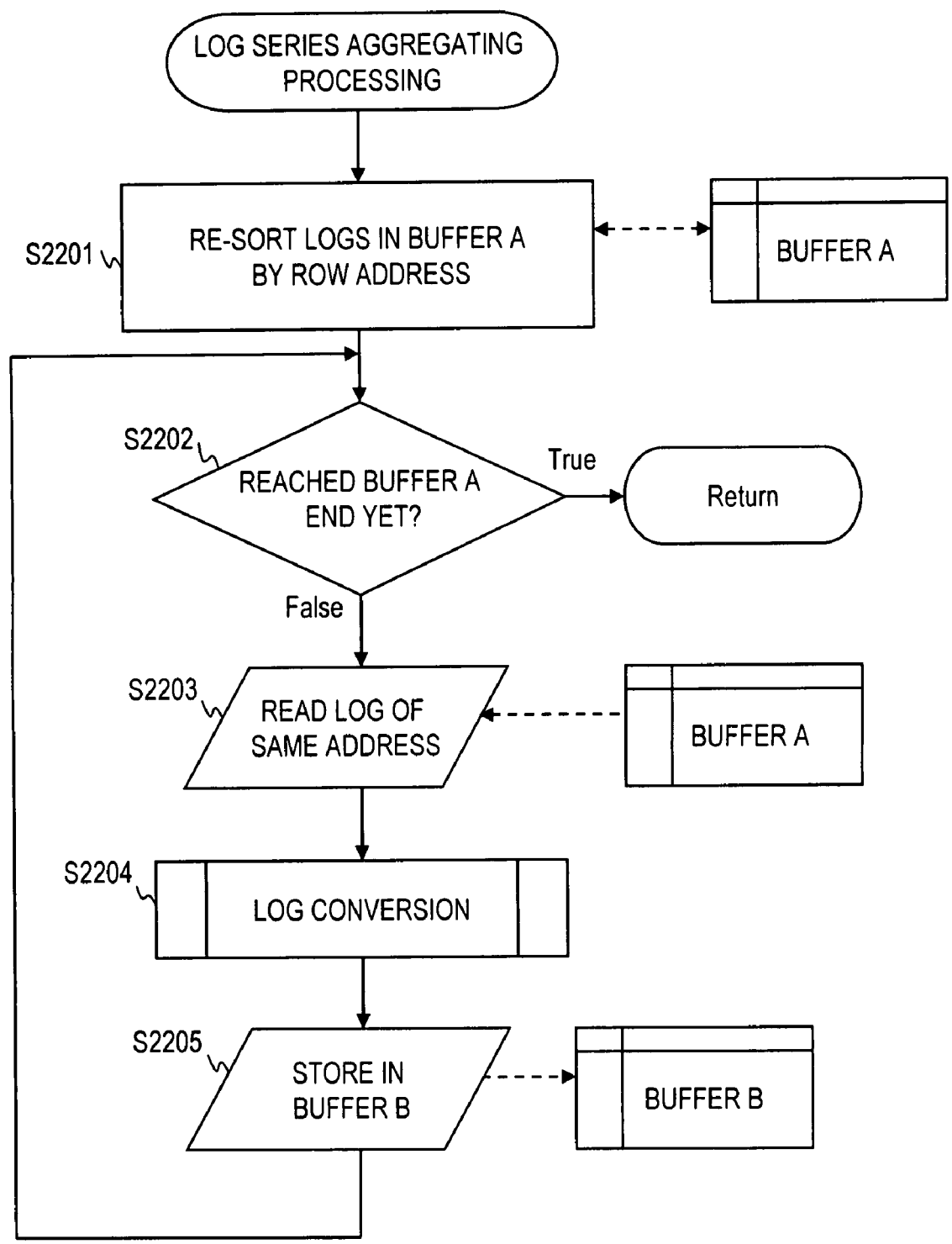
FIG. 19 is a flow chart of log aggregating processing.

FIG. 19 is a flow chart of the log series aggregating processing in the step S2003 of FIG. 17.

This processing is executed by the DB reorganization processing unit 213.

As described above, the logs in the imported log series are put through log conversion by aggregating the logs for each row address.

First, the logs stored in the buffer A are re-sorted by their row addresses (a step S2201).

Then the DB reorganization processing unit 213 judges whether a re-sorted log in the buffer A has been read to its end or not (a step S2202). When it is judged that the re-sorted log end has been reached, the next step is to return to the flow chart of FIG. 17.

When it is judged that the re-sorted log end has not been reached yet, logs of the same row address are read out of the buffer A (a step S2203).

The logs of the same row address that have been read in the previous step are converted (a step S2204). The conversion will be described later with reference to FIG. 20. The conversion aggregates the logs into one log for this same row address.

The converted log is stored in the buffer B (a step S2205). Logs converted and stored in the buffer B are sorted by their row addresses. The processing then returns to the step S2202 to start processing the next row address.

Figure 20:
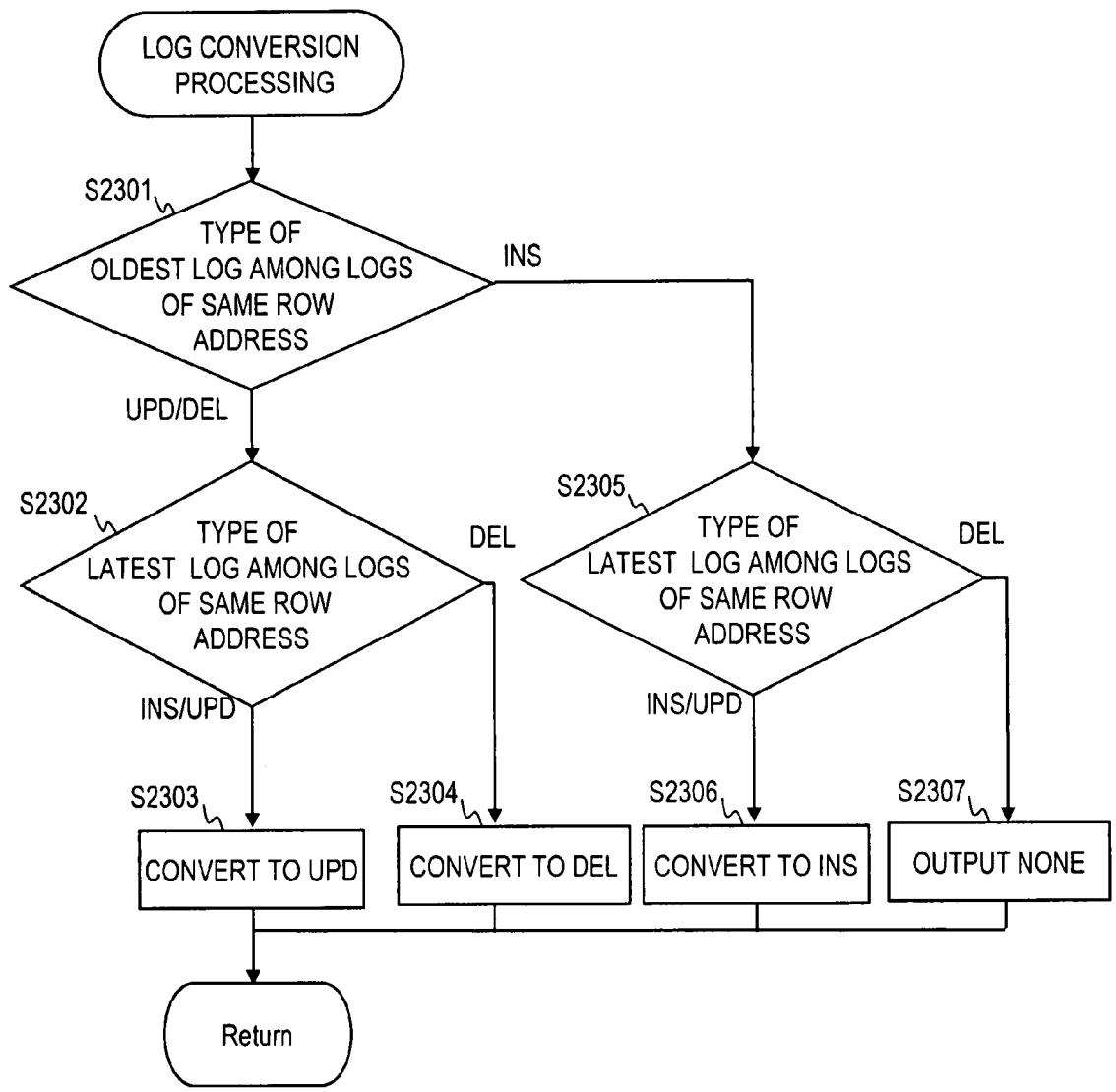
FIG. 20 is a flow chart of log conversion.

FIG. 20 is a flow chart of the log conversion in the step S2203 of FIG. 19.

This processing is executed by the DB reorganization processing unit 213.

First, the type of the oldest log among logs of the same row address is determined (a step S2301). When the oldest log is determined as an update (UPD) log or a deletion (DEL) log, the processing moves to a step S2302. When the oldest log is determined as an insertion (INS) log, the processing moves to a step S2305.

In the step S2302, the type of the latest log among logs of the same row address is determined. When the latest log is determined as an INS log or a UPD log, the logs for this row address are converted into a UPD log in a step S2303.

When the latest log is determined as a DEL log, the logs for this row address are converted into a DEL log in a step S2304.

Similarly, in the step S2305, the type of the latest log among logs of the same row address is determined. When the latest log is determined as an INS log or a UPD log, the logs for this row address are converted into an INS log in a step S2306.

When the latest log is determined as a DEL log, no log for this row address is outputted in a step S2307.

Completion of the log conversion is followed by return to the processing of FIG. 19.

Figure 21:
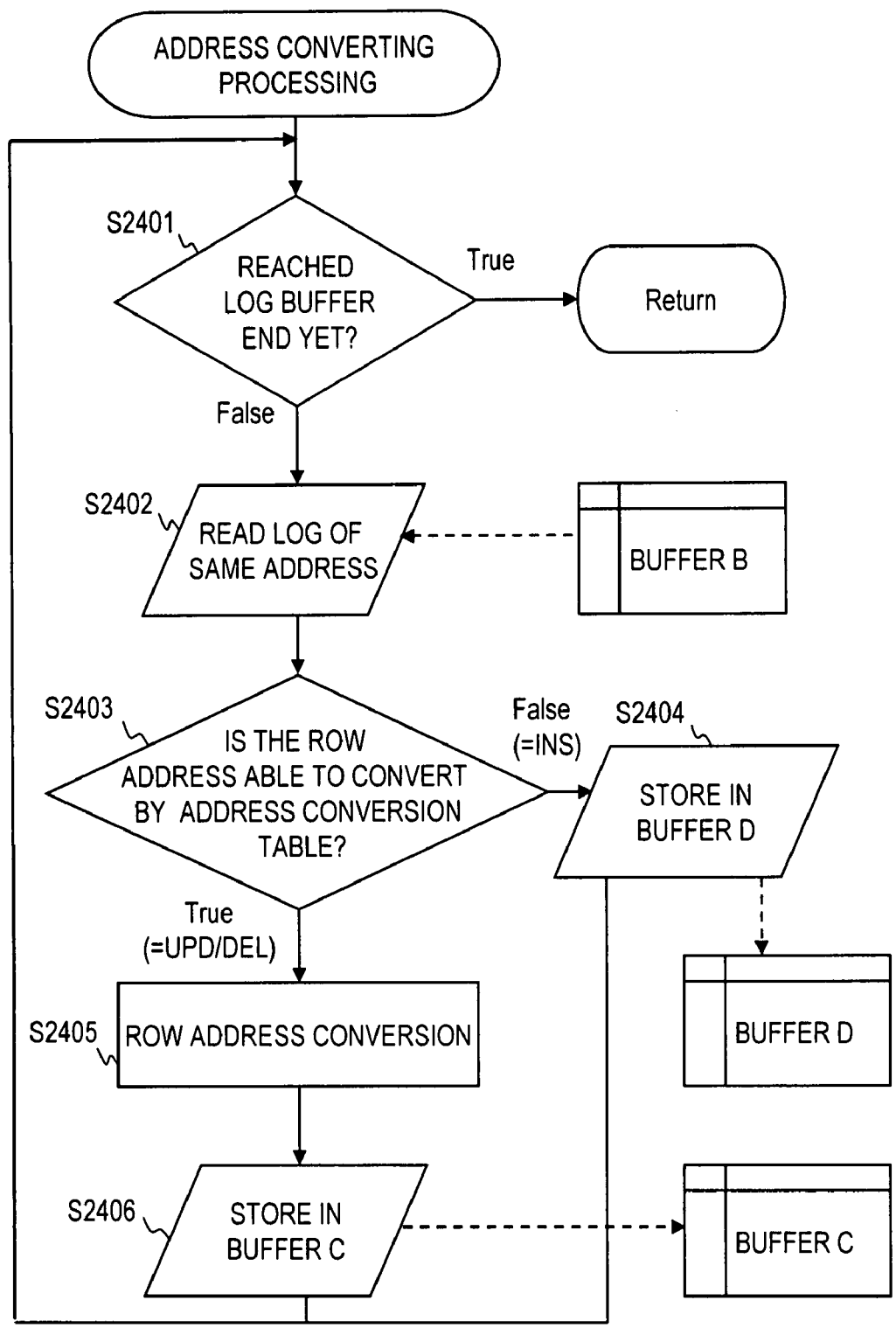
FIG. 21 is a flow chart of address conversion processing.

FIG. 21 is a flow chart of the address conversion processing in the step S2004 of FIG. 17.

This processing is executed by the DB reorganization processing unit 213.

First, whether a log stored in the buffer B has been read to its end or not is judged (a step S2401). When it is judged that the log end has been reached, the next step is to return to the flow chart of FIG. 17.

When it is judged that the log end has not been reached yet, logs of the same row address are read out of the buffer B (a step S2402).

The DB reorganization processing unit 213 then judges whether the row address of the read logs is listed in the address conversion table or not (a step S2403). When it is judged that this row address is not listed in the address conversion table, the processing moves to a step S2404, where the logs are stored in the buffer D.

When it is judged that this row address is listed in the address conversion table, the processing moves to a step S2405, where the row address of the logs is converted into a row address after reorganization processing according to the address conversion table.

Next, the logs whose row address has been converted are stored in the buffer B (a step S2406).

Figure 22:
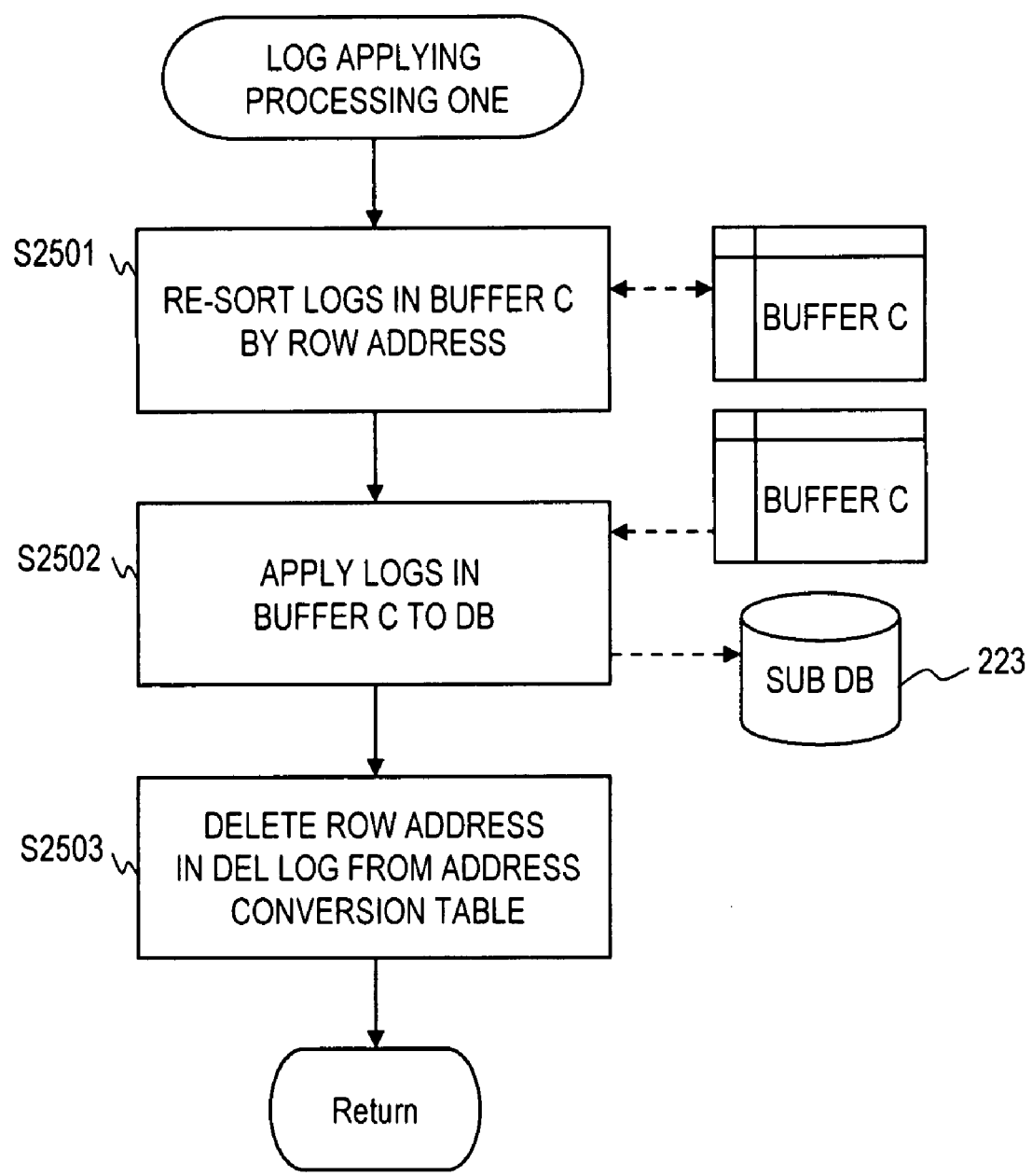
FIG. 22 is a flow chart of Log Applying Processing One.

FIG. 22 is a flow chart of Log Applying Processing One in the step S2005 of FIG. 17.

This processing is executed by the DB reorganization processing unit 213.

First, the logs stored in the buffer C are re-sorted by their row addresses (a step S2501).

The re-sorted logs are read and applied to a database in the disk drive 220 (a step S2502). Specifically, the read logs are applied to row addresses shown in logs in the database.

A row address of a DEL (deletion) log among the applied logs is deleted from the address conversion table (a step S2503).

Completion of Log Applying Processing One is followed by return to the processing of FIG. 17.

The log applying processing can be increased in processing speed by separating a log in one magnetic disk drive of the disk drive 220 from a log in another and by parallel-processing the logs in different magnetic disk drives.

Figure 23:
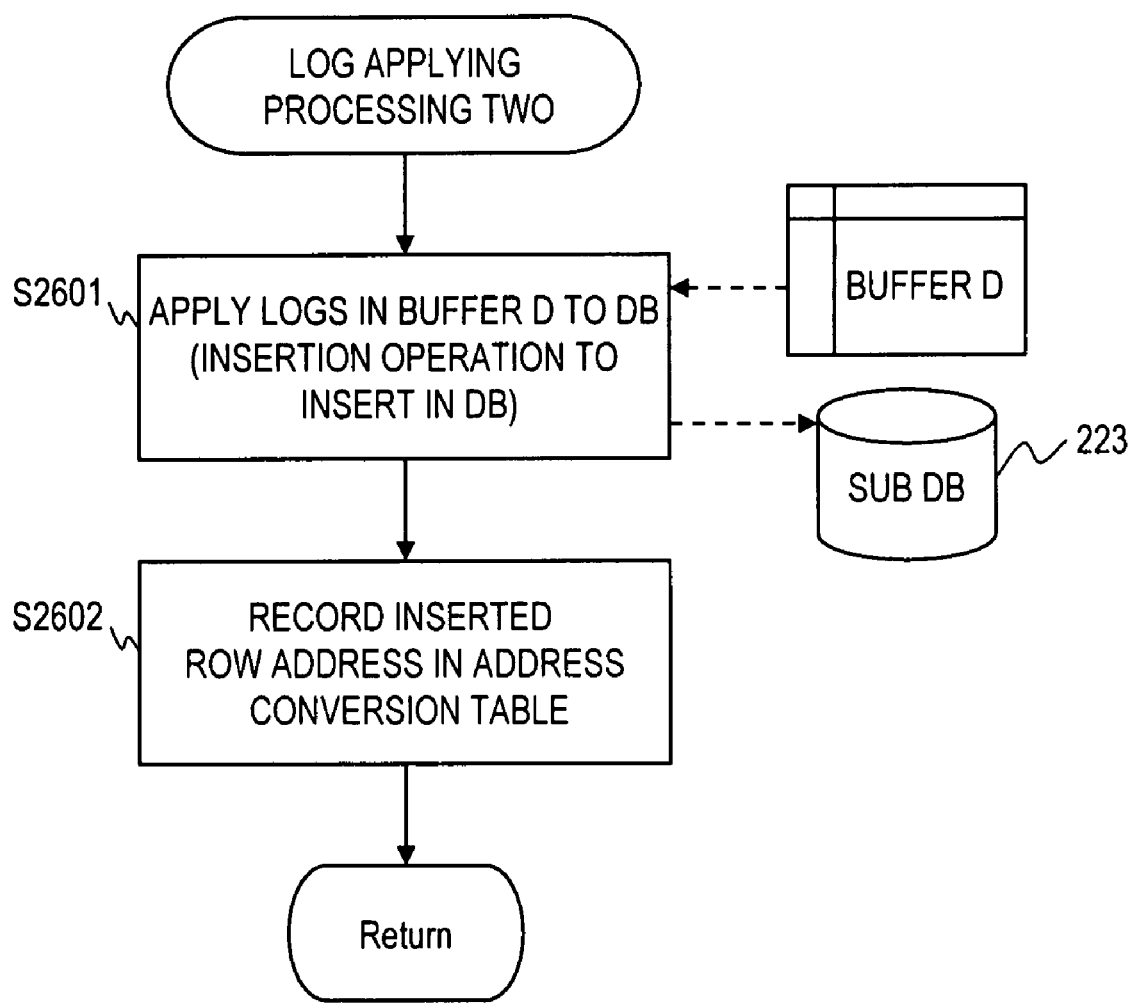
FIG. 23 is a flow chart of Log Applying Processing Two.

FIG. 23 is a flow chart of the Log Applying Processing Two in the step S2006 of FIG. 17.

This processing is executed by the DB reorganization processing unit 213.

First, the logs stored in the buffer D are read and applied to a database in the disk drive 220 (a step S2601). Specifically, since all of these logs are INS logs as shown in FIG. 16B, insertion to the database is processed according to the logs (the step S2601).

Next, row addresses of the applied logs are registered in the address conversion table (a step S2602).

Completion of Log Applying Processing Two is followed by return to the processing of FIG. 17.

In this way, through the table log catch-up processing of FIG. 17, logs about row blocks that are recorded during reorganization processing are applied to the reorganized database.

Described next is index log catch-up processing.

Figure 24:
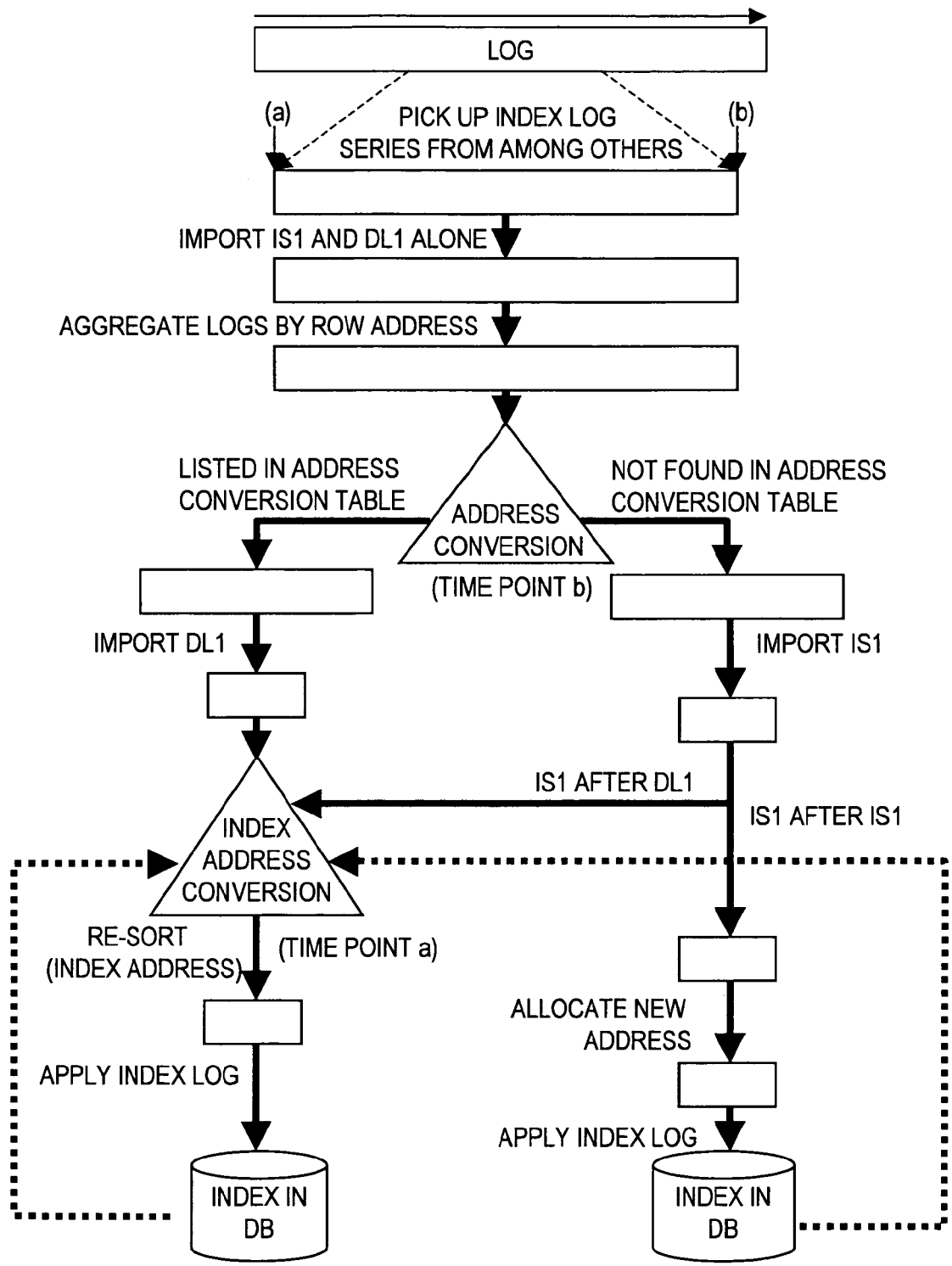
FIG. 24 is a flow chart outlining index log catch-up processing.

FIG. 24 is a flow chart outlining index log catch-up processing.

This processing is executed by the DB reorganization processing unit 213.

First, the DB reorganization processing unit 213 picks out index logs recorded during reorganization processing from among other logs stored in time series.

It is necessary to take into consideration not only the logs made during the reorganization processing but also logs that are recorded during execution of the index log catch-up processing following the reorganization processing. Log catch-up processing for the logs that are recorded during the index log catch-up processing of the logs that are made during the reorganization processing can be further carried out after the index log catch-up processing is completed, or while the index log catch-up processing is performed, or at other times.

Next, the DB reorganization processing unit 213 imports index logs IS1 (insertion) and DL1 (deletion) from the picked-out index logs.

Then the DB reorganization processing unit 213 aggregates the imported index logs for each row address. Specifically, the imported index logs are grouped by their row addresses and are arranged in time series. The arranged index logs are converted such that index logs having the same row address make one index log. This index log conversion will be described later with reference to FIG. 27.

The DB reorganization processing unit 213 then judges whether a row address of a converted index log is listed in the address conversion table or not.

In the case where the row address is listed in the address conversion table, a row address after reorganization processing can be obtained by searching the address conversion table 226 with the row address contained in this index log. On the other hand, in the case where the row address is not listed in the address conversion table, the raw address has not existed prior to the reorganization processing and has been inserted during the reorganization processing.

Whether a row address is listed in the address conversion table or not is judged by referring to a row address of an index log. For a row address listed in the address conversion table, a row address whose oldest index log is a "DL1" log is imported.

Next, the DB reorganization processing unit 213 converts an index address based on the address conversion table.

At this point, an index address of which an index entry has been deleted during the reorganization processing cannot be converted, and an index entry is deleted according to an index log for this index address.

As an index address converted based on the address conversion table, first, the DB reorganization processing unit 213 re-sorts index logs by index addresses. The re-sorted index logs are applied to the database.

For a row address of a converted index log that is not listed in the address conversion table, a row address whose oldest index log is an IS1 log is imported. In the case where a row address that is not listed in the address conversion table has an IS1 log as the oldest index log and a DL1 log as the latest index log, an index log for this row address is treated as a log listed in the address conversion table. For this index log, a new row address area is inserted. The new row address is recorded in the address conversion table 226.

Figure 25A:
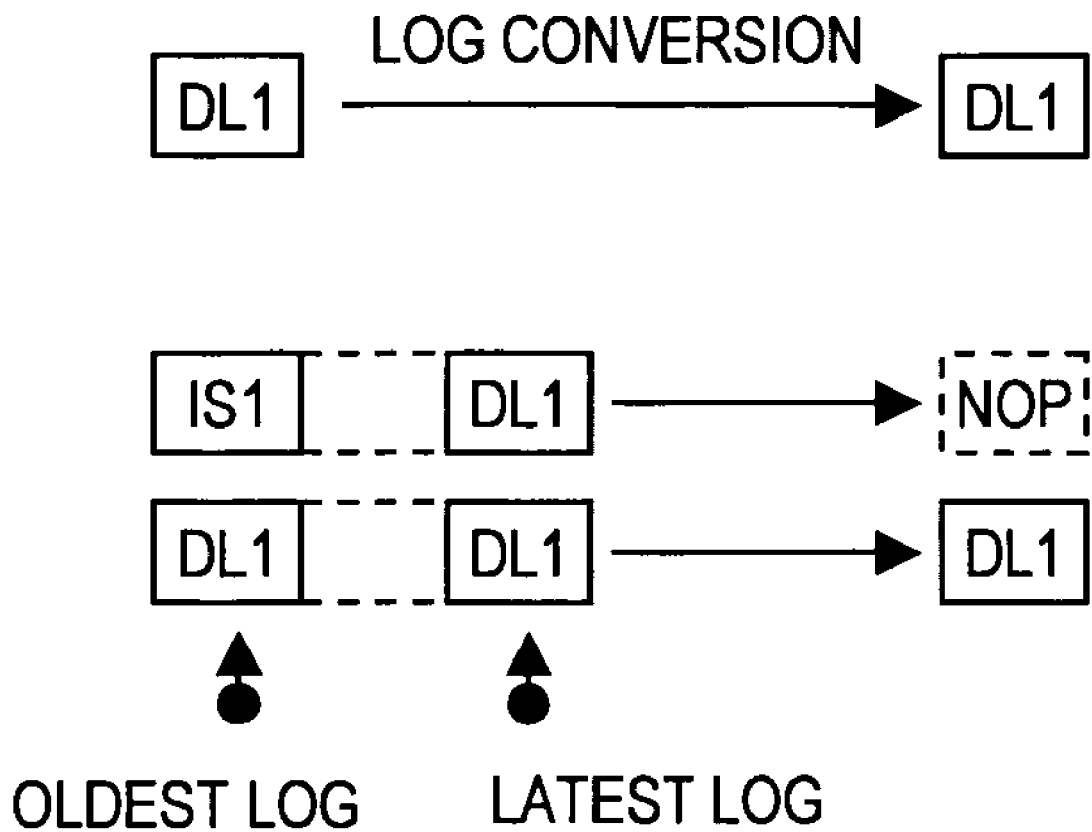
FIG. 25A is an explanatory diagram of index log address conversion.
Figure 25B:
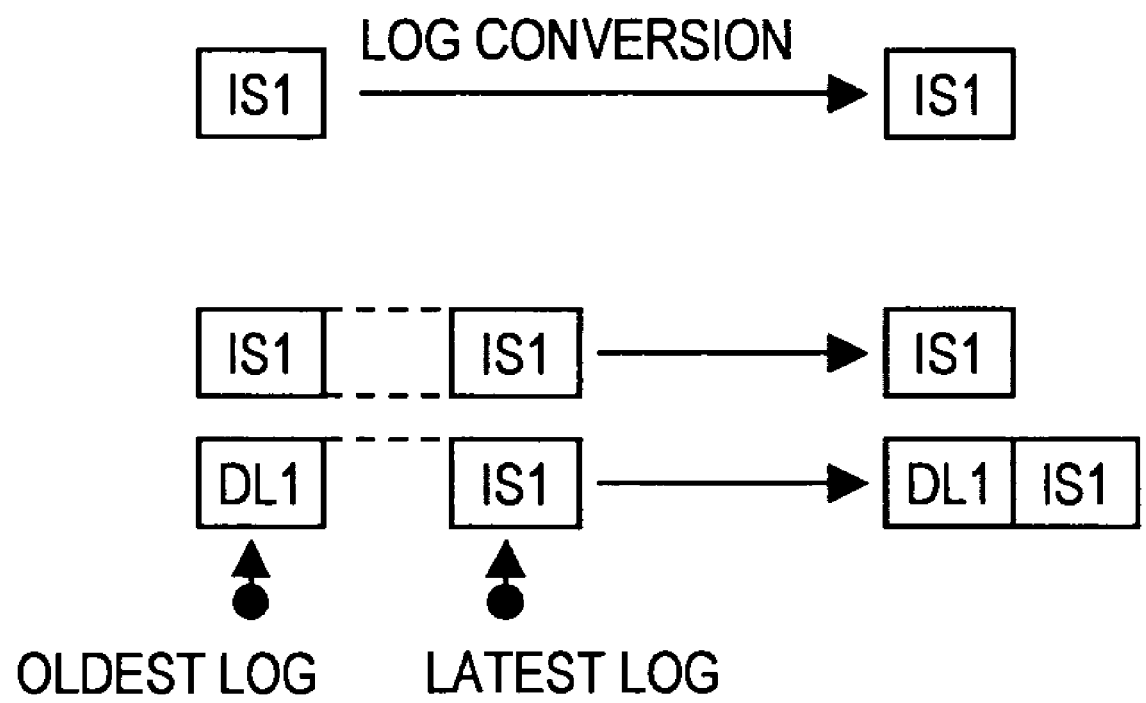
FIG. 25B is an explanatory diagram of index log address conversion.

FIGS. 25A and 25B are explanatory diagrams of index log address conversion.

In the case of an index log for an index address that has not been present before reorganization processing is started, a row address corresponding to this index address is converted with the use of the address conversion table as shown in FIG. 25A.

In this case, when deletion (DL1) is the only operation performed on the row identified by this row address, there is only a "DL1" log, and the "DL1" log serves as the log for this row address without log conversion.

When plural index logs are recorded for one same index address, the oldest (the first index log recorded) and latest (the last index log recorded) of the plural index logs alone are picked out for log conversion.

In the case where the oldest log is an "IS1" log and the latest log is a "DL1" log, the log conversion aggregates the logs into an "NOP" (No operation) log for this index address, meaning that no operation is performed on an index entry of this index address.

In the case where the oldest log is a "DL1" (deletion) log and the latest log is also a "DL1" log, the log conversion aggregates the logs into one "DL1" log for this row address.

When "IS1" (insertion) is the only operation performed on an index entry at an existing index address in the database, there is only an "IS1" log, and the "IS1" log serves as the log for this index address without log conversion as shown in FIG. 25B.

When plural index logs are recorded for one same index address, the oldest (the first index log recorded) and latest (the last index log recorded) of the plural index logs alone are picked out for log conversion.

In the case where the oldest log is an "IS1" log and the latest log is also an "IS1" log, the log conversion aggregates the logs into one "IS1" log for this row address.

In the case where the oldest log is a "DL1" (deletion) log and the latest log is an "IS1" log, the log conversion results in two logs, "DL1" and "IS1" for this row address.

Figure 26:
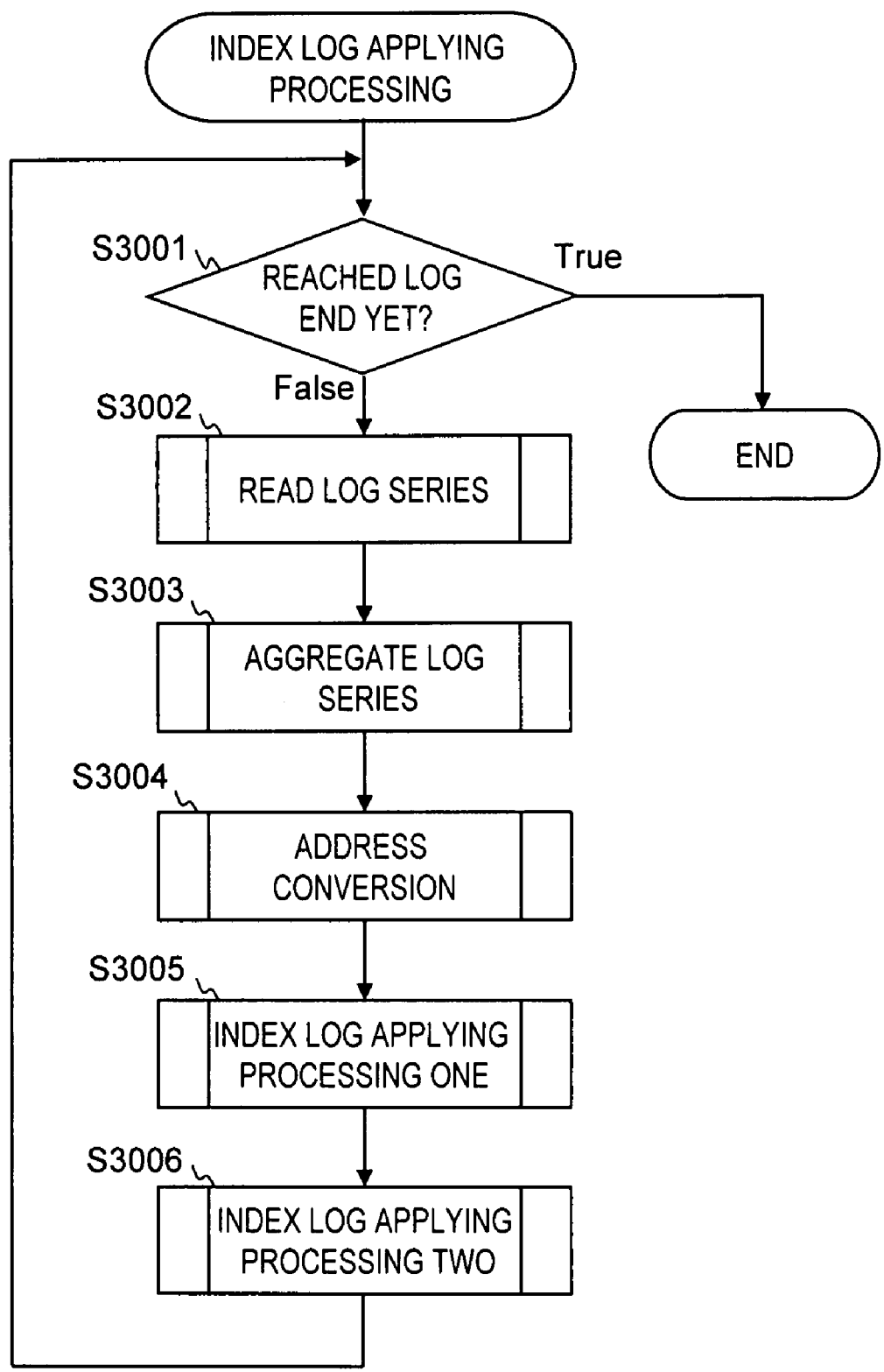
FIG. 26 is a flow chart showing index log catch-up processing.

FIG. 26 is a flow chart showing index log catch-up processing.

This processing is executed by the DB reorganization processing unit 213.

First, the DB reorganization processing unit 213 judges whether an index log has been read to its end or not (a step S3001).

When it is judged that the index log end has been reached, the processing is terminated.

When it is judged that the index log end has not been reached yet, the DB reorganization processing unit 213 executes index log reading processing (a step S3002). Through this processing, necessary index logs are imported as a log series from the log 221 and stored in a buffer E.

The DB reorganization processing unit 213 executes aggregation processing of the index log series stored in the buffer E (a step S3003). This processing converts the index log series such that index logs having the same row address make one index log. The converted logs are stored in a buffer F.

Next, the DB reorganization processing unit 213 executes address conversion processing (a step S3004). Through this processing, index logs that are listed in the address conversion table and index logs that are not are discriminated from each other to be stored in different buffers, a buffer G and a buffer H.

Next, the DB reorganization processing unit 213 executes Index Log Applying Processing One in which the index logs stored in the buffer G are applied to the table of the database (a step S3005).

Index the DB reorganization processing unit 213 executes Index Log Applying Processing Two in which the index logs stored in the buffer H are applied to the table of the database (a step S3006).

The above processing is repeated until every index log is read.

The steps S3005 and S3006 may not always be executed in the processing order shown in the flow chart. Index Log Applying Processing One and Index Log Applying Processing Two may be started as soon as the index logs are stored in the buffers G and H, respectively.

The buffers E, F, G and H are provided in the memory 216 of the disk control unit 210.

Figure 27:
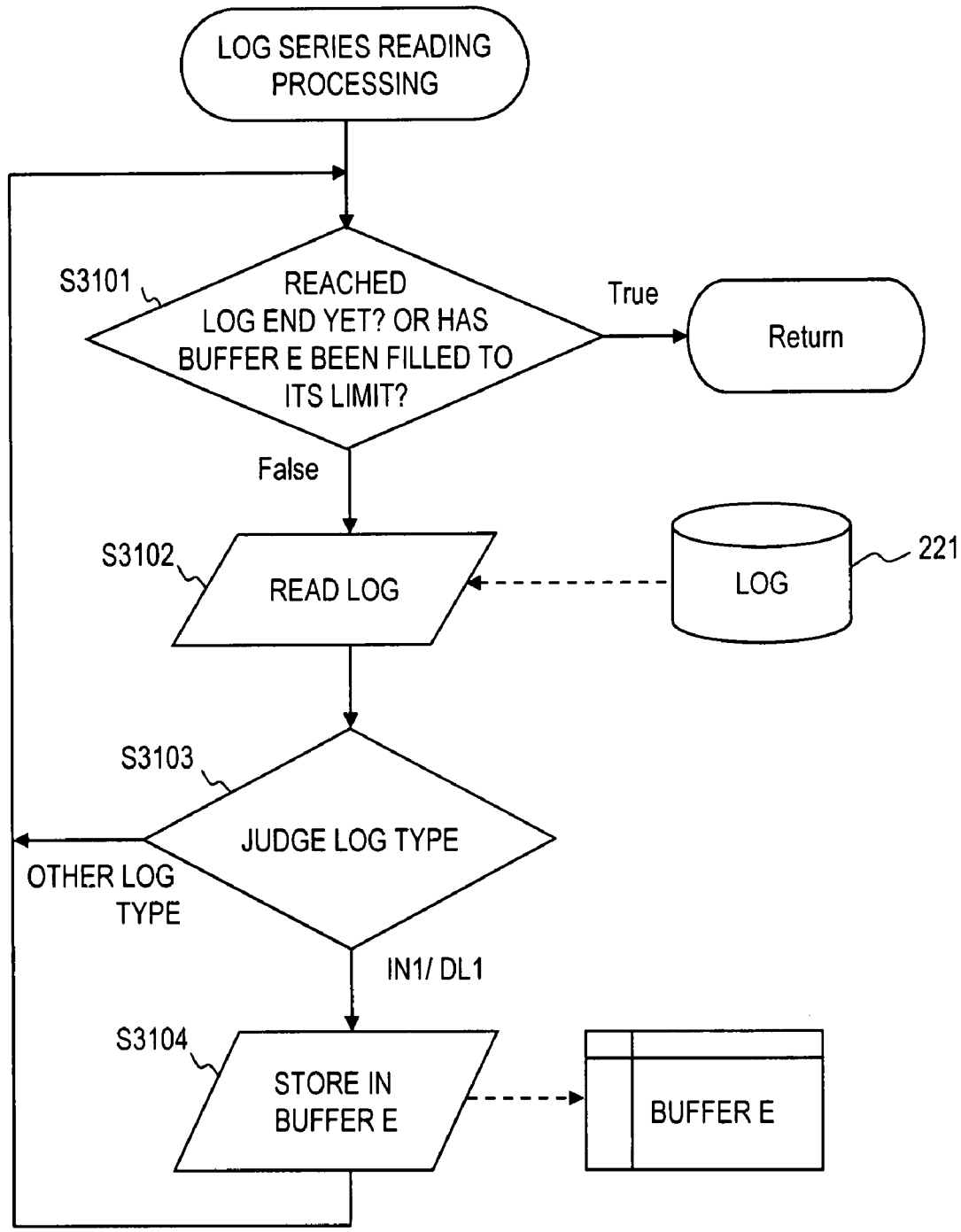
FIG. 27 is a flow chart of index log reading processing.

FIG. 27 is a flow chart of the index log series reading processing in the step S3002 of FIG. 26.

This processing is executed by the DB reorganization processing unit 213.

First, the DB reorganization processing unit 213 judges whether an index log has been read to its end or not, or whether the buffer E has been filled with stored index logs to the set limit of its capacity or not (a step S3101).

When it is judged that the index log end has been reached, or that the buffer E has been filled to the limit, the next step is to return to the flow chart of FIG. 26.

On the other hand, when it is judged that the index log end has not been reached yet, or that the buffer E has not been filled to the limit yet, an index log recorded in the log 221 during reorganization processing is read (a step S3102).

Next, the type of the read index log is determined (a step S3103). When the type of the read index log is IN1 (insertion) or DL1 (deletion), the processing moves to a step S3104 where this index log is stored in the buffer E.

When the type of the read index log is neither IN1 (insertion) nor DL1 (deletion), there is no need to apply the index log, and the processing returns to the step S3101.

Through the index log series reading processing, index logs necessary for index log catch-up processing, namely, IS1 (insertion) logs and DL1 (deletion) logs are imported and stored in the buffer E.

Figure 28:
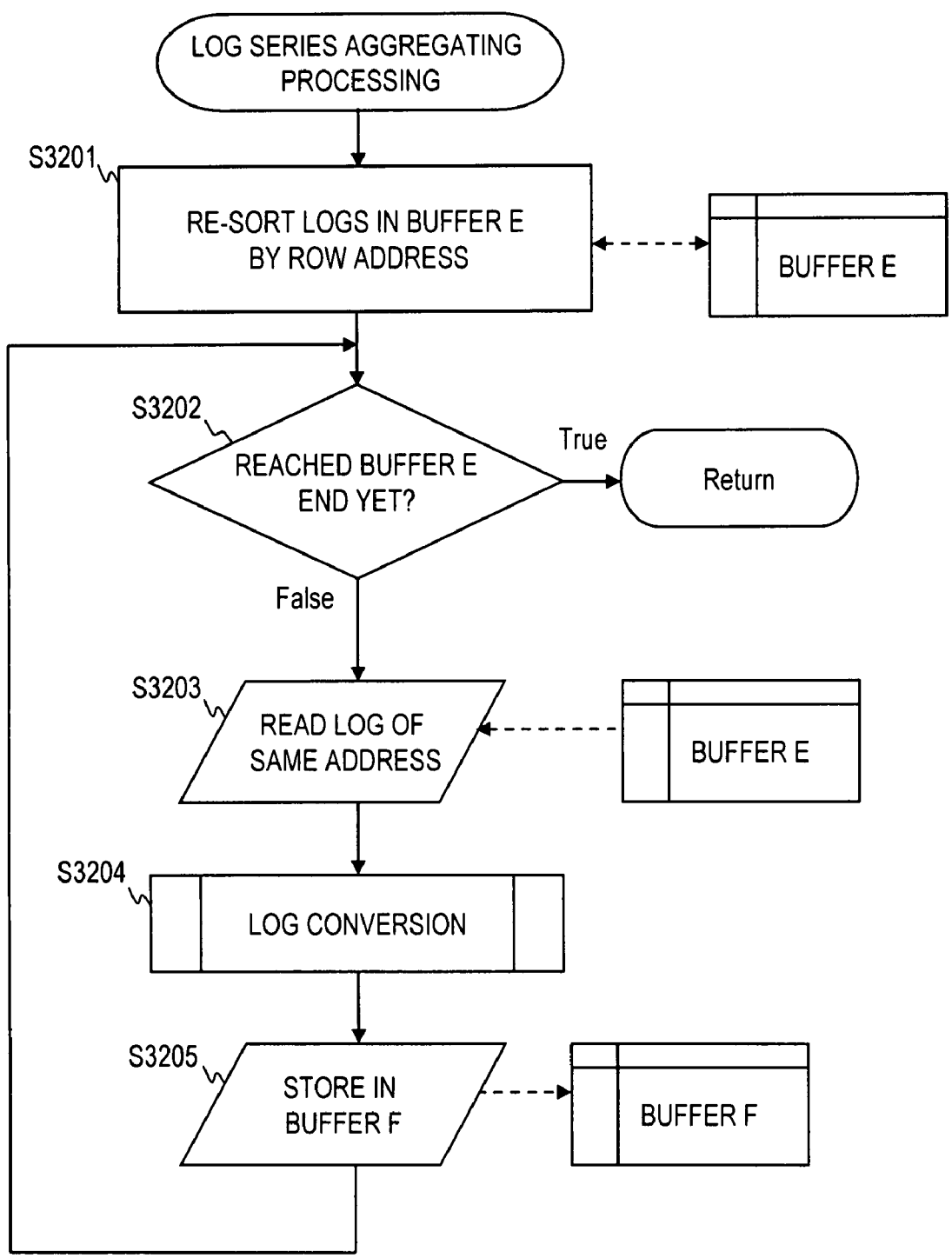
FIG. 28 is a flow chart of index log aggregating processing.

FIG. 28 is a flow chart of the index log series aggregating processing in the step S3003 of FIG. 26.

This processing is executed by the DB reorganization processing unit 213.

As described above, the index logs in the imported index log series are put through log conversion by aggregating the index logs for each row address.

First, the index logs of the index log series stored in the buffer E are re-sorted by their row addresses (a step S3201).

Then the DB reorganization processing unit 213 judges whether a re-sorted index log in the buffer E has been read to its end or not (a step S3202). When it is judged that the re-sorted index log end has been reached, the next step is to return to the flow chart of FIG. 26.

When it is judged that the re-sorted index log end has not been reached yet, index logs of the same row address are read out of the buffer E (a step S3203).

The index logs of the same row address that have been read in the previous step are converted (a step S3204). The conversion will be described later with reference to FIG. 29. The conversion aggregates the index logs into one index log for this same row address.

The converted index log is stored in the buffer F (a step S3205). The processing then returns to the step S3202 to start processing the next row address.

Figure 29:
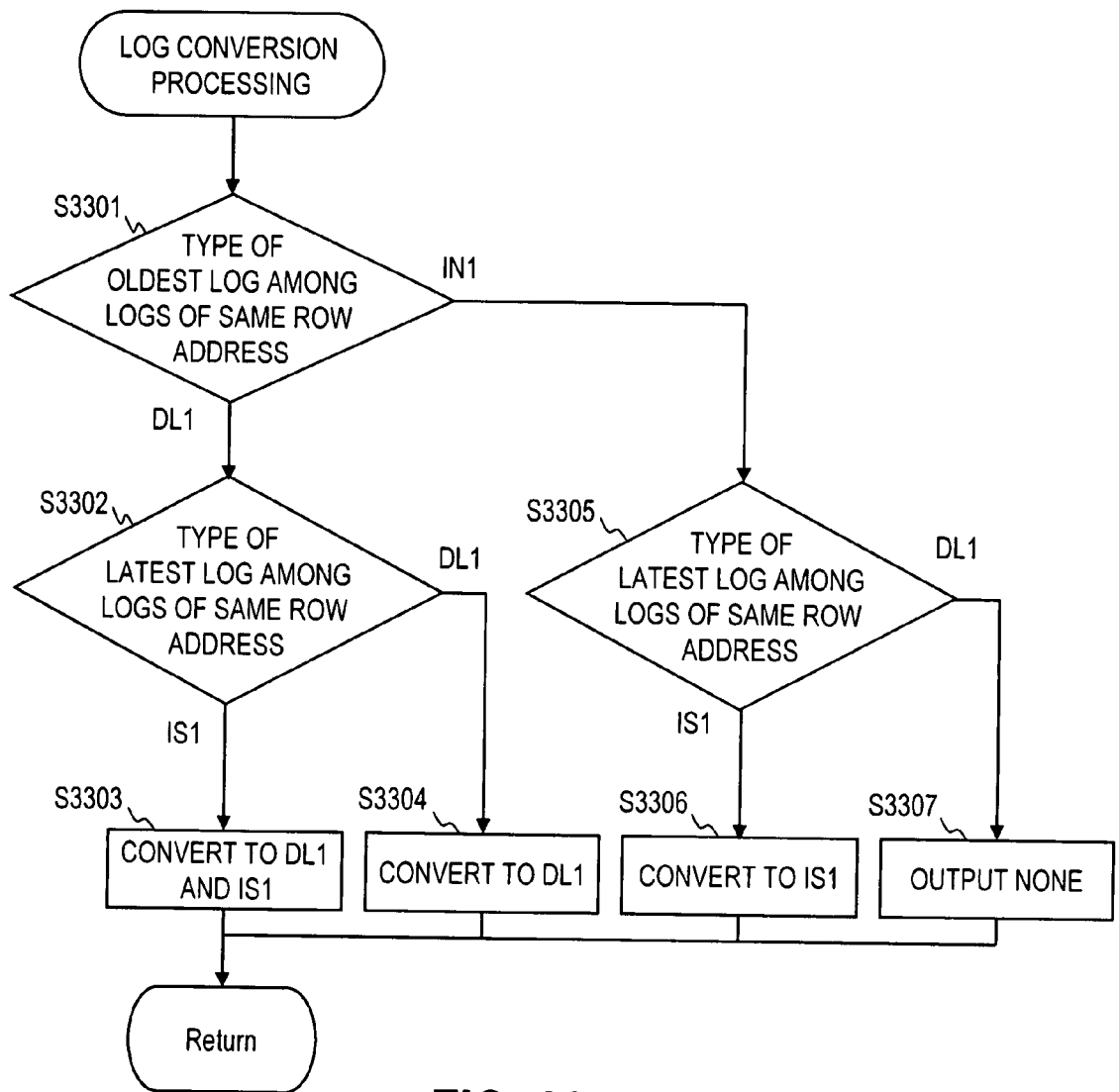
FIG. 29 is a flow chart of index log conversion.

FIG. 29 is a flow chart of the index log conversion of FIG. 28.

This processing is executed by the DB reorganization processing unit 213.

First, the type of the oldest index log among index logs of the same row address is determined (a step S3301). When the oldest index log is determined as a DL1 log, the processing moves to a step S3302. When the oldest index log is determined as an IS1 log, the processing moves to a step S3305.

In the step S3302, the type of the latest index log among index logs of the same row address is determined. When the latest index log is determined as an IS1 log, the index logs for this row address are converted into DL1 and IS1 logs in a step S3303.

When the latest index log is determined as a DL1 log, the index logs for this row address are converted into a DL1 log in a step S3304.

Similarly, in the step S3305, the type of the latest index log among index logs of the same row address is determined. When the latest index log is determined as an IS1 log, the index logs for this row address are converted into an IS1 log in a step S3306.

When the latest index log is determined as a DL1 log, no index log for this row address is outputted in a step S3307.

Completion of the index log conversion is followed by return to the processing of FIG. 28.

Figure 30:
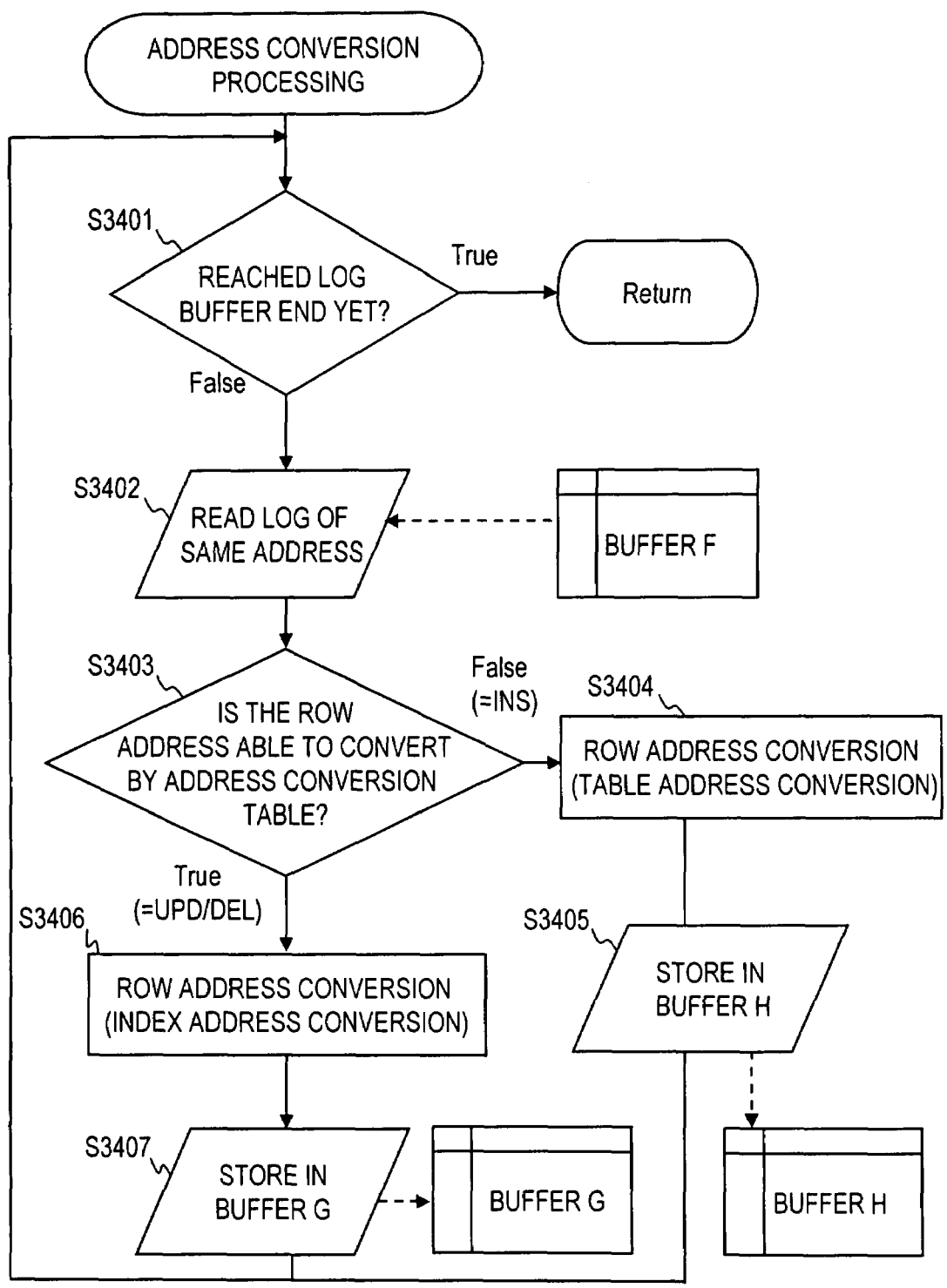
FIG. 30 is a flow chart of address conversion processing.

FIG. 30 is a flow chart of the address conversion processing in the step S3004 of FIG. 26.

This processing is executed by the DB reorganization processing unit 213.

First, whether an index log stored in the buffer F has been read to its end or not is judged (a step S3401). When it is judged that the index log end has been reached, the next step is to return to the flow chart of FIG. 26.

When it is judged that the index log end has not been reached yet, index logs of the same row address are read out of the buffer F (a step S3402).

The DB reorganization processing unit 213 then judges whether or not the row address of the read index logs is listed in the address conversion table so that the row address can be retrieved from the address conversion table (a step S3403). When it is judged that this row address is not listed in the address conversion table, the processing moves to a step S3404.

In the step S3404, the index logs for this row address are converted into another row address with the use of the address conversion table. The index logs having the converted row address are stored in the buffer H (a step S3405).

On the other hand, when it is judged that this row address is listed in the address conversion table, the processing moves to a step S3406, where the index address of the index logs for this row address is converted into another index address according to the address conversion table.

Then the index logs whose row address has been converted are stored in the buffer G (a step S3407).

Figure 31:
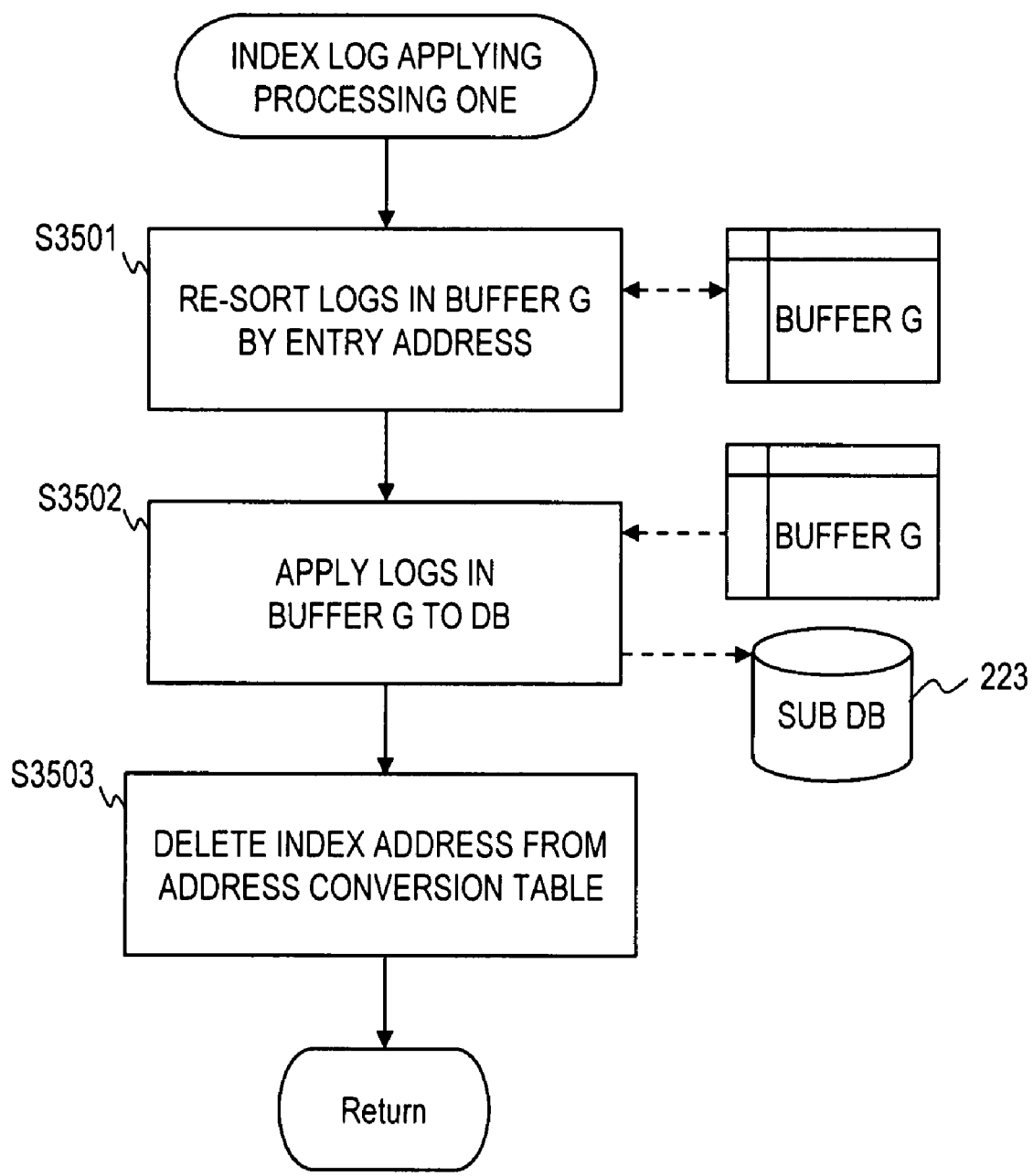
FIG. 31 is a flow chart of Index Log Applying Processing One.

FIG. 31 is a flow chart of Index Log Applying Processing One in the step S3005 of FIG. 26.

This processing is executed by the DB reorganization processing unit 213.

First, the index logs stored in the buffer G are re-sorted by index addresses (a step S3501).

The re-sorted index logs are read and applied to a database in the disk drive 220 (a step S3502). Specifically, the read index logs are applied to index entries at index addresses shown in the read index logs.

An index address of a DL1 (deletion) index log among the applied index logs is deleted from the address conversion table (a step S3503).

Completion of Index Log Applying Processing One is followed by return to the processing of FIG. 26.

The index log applying processing can be increased in processing speed by separating an index log in one magnetic disk drive of the disk drive 220 from an index log in another and by parallel-processing the index logs in different magnetic disk drives.

Figure 32:
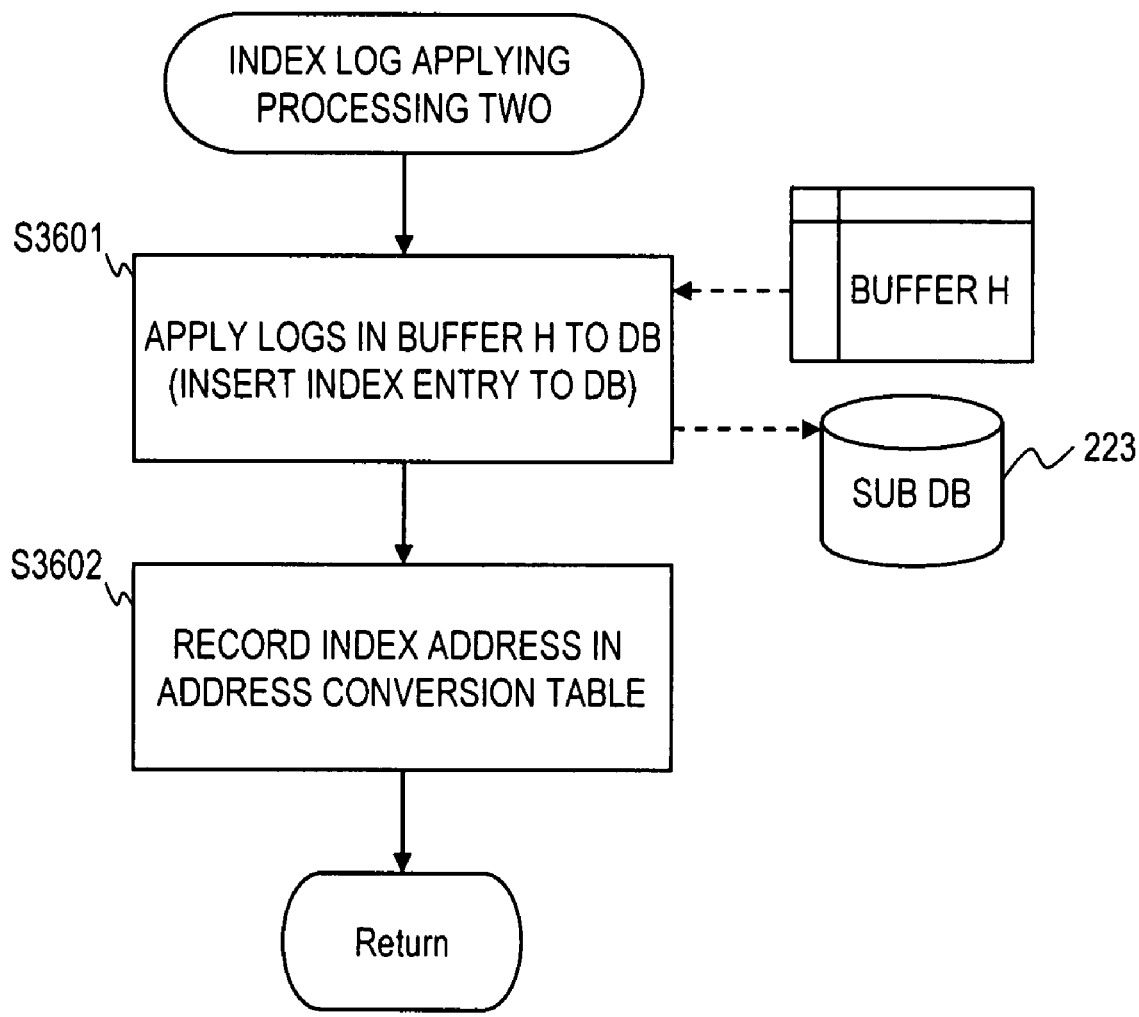
FIG. 32 is a flow chart of Index Log Applying Processing Two.

FIG. 32 is a flow chart of Index Log Applying Processing Two in the step S3006 of FIG. 26.

This processing is executed by the DB reorganization processing unit 213.

First, the index logs stored in the buffer H are read and applied to a database in the disk drive 220 (a step S3601). Specifically, index entry areas are inserted at index addresses shown in the read index logs, and the read index logs are applied in the inserted areas.

Next, the index addresses where the index entries are inserted are registered in the address conversion table (a step S3602).

Completion of Index Log Applying Processing Two is followed by return to the processing of FIG. 26.

In this way, through the index log catch-up processing of FIG. 26, database index logs that are recorded during reorganization processing are applied to the reorganized LU.

As has been described, with the storage device 200 having the reorganization processing unit 213, which embodies the reorganization processing function, the database system of this embodiment according to this invention can have the storage device 200 perform database reorganization processing upon instruction from the host computer 100. In the reorganization processing, the storage device 200 stores logs of database-related transactions made during the reorganization, and executes catch-up processing of the stored logs after completion of the reorganization. Thus the database system reorganizes a database without stopping the system's processing.

The description given next is about a database system which is a modified example of the above embodiment.

The database system according to the above embodiment is structured such that the storage device 200 executes reorganization processing upon instruction from the host computer 100. In this modified example, the storage device 200 does not wait for an instruction from the host computer 100 but decides to start reorganization processing on its own and executes reorganization processing. Details thereof are described below.

The storage device 200 executes, as in the above embodiment, reorganization processing upon receiving a reorganization command from the host computer 100. The storage device 200 also executes reorganization processing when no reorganization command is received but a designated condition is fulfilled.

The designated condition may be, for example, a time interval or may be when a logical volume storing a database is filled to its high water mark with data and has no area left to store new data.

When the designated condition is met, the DB reorganization processing unit 213 of the storage device 200 makes an inquiry about the location of a check point of the database to the access control unit 215. A check point is information indicating a time point at which all transactions are committed in order to ensure data consistency of the database.

Of plural check points, the DB reorganization processing unit 213 obtains the latest check point and the second-latest check point.

The DB reorganization processing unit 213 recognizes logs recorded between these two check points.

Then the processing of FIG. 10 is executed in the storage device 200. Specifically, the DB reorganization processing unit 213 splits a volume pair (the step S1402 in FIG. 10), sets the main DB 222 as the only current database, and performs reorganization processing on the sub DB 223. Log catch-up processing in this case uses logs recorded between the obtained latest check point and its preceding check point.

As has been described, in this modified example, the storage device 200 decides to start reorganization processing on its own without waiting for an instruction from the host computer 100, and the processing load of the host computer 100 is thus lightened.

While the present invention has been described in detail and pictorially in the accompanying drawings, the present invention is not limited to such detail but covers various obvious modifications and equivalent arrangements, which fall within the purview of the appended claims.

What is claimed is:

1. A method of reorganizing a database which is stored in a disk drive of a storage device and which is accessed by a host computer, the disk drive containing a first volume where the database is stored and a second volume paired with the first volume to store a copy of the database, the method comprising the steps of:

making a transaction of the host computer into a quiescent state;

splitting the paired first volume and second volume, wherein the database is able to be accessed in the first volume but not the second volume;

releasing the quiescent state of the transaction;

reorganizing the second volume by copying and reorganizing data of the second volume into an unloading volume in the storage system;

copying the reorganized data from the unloading volume to the second volume;

updating the second volume using log data; and copying the reorganized and updated data in the second volume to the first volume to resynchronize and pair the first volume and the second volume with each other, wherein the disk drive further contains a third volume to store a log of the log data which is made when the database is accessed, and a fourth volume as the unloading volume where a copy of the data of the database stored in the second volume is stored, and wherein the step of reorganizing the second volume comprises the steps of:

reorganizing data of the database which is stored in the second volume and copying the reorganized data to the fourth volume;

initializing the second volume after completion of copying the reorganized data to the fourth volume;

restoring the reorganized data of the database which is stored in the fourth volume to the second volume;

obtaining, from the third volume, logs which are entered after the quiescent state of the transaction is released; and reflecting the logs on the reorganized data of the database which is stored in the second volume.

2. The reorganization method according to claim 1, wherein the step of reflecting the logs to the database which is stored in the second volume comprises:

reflecting logs about database table blocks among the obtained logs on the database which is stored in the second volume; and reflecting logs about database index blocks among the obtained logs on the database which is stored in the second volume.

3. The reorganization method according to claim 1, wherein the step of reflecting the logs to the database which is stored in the second volume comprises:

referring to oldest and latest logs of logs having the same address from the obtained logs to aggregate the oldest and latest logs into one or two logs; and then, reflecting the aggregated log on the database which is stored in the second volume.

4. The reorganization method according to claim 3, wherein the storage device has an address conversion information in which pre-reorganization addresses of table blocks in the second volume are stored in association with post-reorganization addresses of the table blocks, and wherein the step of reflecting the logs on the database which is stored in the second volume comprises:

importing logs of designated types from the obtained logs;

grouping the imported logs by addresses, corresponding to the logs, of the database in the second volume;

converting the grouped logs having the same address to one log;

converting the addresses of the converted logs into post-reorganization addresses with the use of the address conversion information when the addresses of the converted logs are listed in the address conversion information, re-sorting the converted logs by converted addresses, and reflecting the converted logs on the database which is stored in the second volume; and creating areas for the addresses in the second volume when the addresses of the converted logs are not listed in the address conversion information, and reflecting the converted logs on the database which is stored in the second volume at the addresses of the created areas.

5. The reorganization method according to claim 3, wherein the storage device has an address conversion information in which pre-reorganization row addresses of table blocks in the second volume are stored in association with post-reorganization row addresses of the table blocks, and wherein the step of reflecting the logs on the database which is stored in the second volume comprises:

importing index logs of designated types from the obtained logs;

grouping the imported index logs by row addresses of table blocks, corresponding to the index logs, in the second volume;

converting the grouped index logs having the same row address to one index log;

converting the row addresses of the converted index logs into post-reorganization row addresses with the use of the address conversion information when the addresses of the converted index logs are listed in the address conversion information, re-sorting the converted index logs by index addresses, and reflecting the converted index logs on the database which is stored in the second volume; and creating areas for the index addresses in the second volume when the addresses of the converted index logs are not listed in the address conversion information, and reflecting the index logs on the database which is stored in the second volume at the index addresses of the created areas.

6. A storage device which stores in a disk drive a database which is accessed by a host computer, comprising:

a database reorganization processing unit in the storage device which reorganizes the database stored in the disk drive, wherein the disk drive contains a first volume, which stores the database, a second volume, which is paired with the first volume to store a copy of the database, a third volume, which stores a log made when the database is accessed, and a fourth volume where a copy of data of the database stored in the second volume can be held, and wherein the database reorganization processing unit:

splits the paired first volume and second volume while a transaction from the host computer is made into a quiescent state;

reorganizes data of the database which is stored in the second volume and copies the reorganized data to the fourth volume;

initializes the second volume after completion of the copying the reorganized data to the fourth volume;

restores the reorganized data of the database which is stored in the fourth volume to the second volume;

obtains, from the third volume, logs which are entered after the quiescent state of the transaction is released;

reflects the logs on the reorganized data of the database which is stored in the second volume;

copies the reorganized data from the second volume to the first volume; and resynchronizes and pairs the first volume and the second volume with each other.

7. The storage device according to claim 6, wherein the database reorganization processing unit:

reflects logs about database table blocks among the obtained logs on the database which is stored in the second volume; and reflects logs about database index blocks among the obtained logs on the database which is stored in the second volume.

8. The storage device according to claim 6, wherein an address conversion information is provided in which pre-reorganization row addresses of table blocks in the second volume are stored in association with post-reorganization row addresses of the table blocks, and wherein the database reorganization processing unit:

imports index logs of designated types from the obtained logs;

groups the imported index logs by addresses, corresponding to the logs, of the second volume;

converts the grouped index logs having the same address to one index log;

converts the row addresses of the converted index logs into post-reorganization row addresses with the use of the address conversion information when the addresses of the converted index logs are listed in the address conversion information;

re-sorts the converted index logs by index addresses, corresponding to the converted index logs, of the second volume;

refers to oldest and latest logs of logs having the same address from the resorted logs to aggregate the oldest and latest logs into one or two logs; and reflects the aggregated log on the database which is stored in the second volume.

9. A database system comprising:

a host computer, and a storage device which stores in a disk drive a database which is accessed by the host computer, wherein the host computer has a database application operation control unit, which controls application operation of the database, wherein the storage device has a host interface, which receives a control signal from the host computer, and a database reorganization processing unit, which reorganizes the database stored in the disk drive, wherein the disk drive contains a first volume, which stores the database, a second volume, which is paired with the first volume to store a copy of the database, a third volume, which stores a log made when the database is accessed, and a fourth volume where a copy of data of the database stored in the second volume can be held, wherein the database application operation control unit:

makes a transaction of the host computer into quiescent state;

splits the volume pair;

enables to be accessed only the database in the first volume;

releases the quiescent state of the transaction; and sends a request for reorganization of the second volume to the storage device, wherein, upon reception of the request to reorganize the second volume from the host computer, the database reorganization processing unit:

reorganizes the data of the database which is stored in the second volume and copies the reorganized data to the fourth volume;

initializes the second volume after completion of the copying the reorganized data to the fourth volume;

restores the reorganized data of the database which is stored in the fourth volume to the initialized second volume;

obtains, from the third volume, logs which are entered after the quiescent state of the transaction is released; and reflects the logs on the second volume, and wherein the database application operation control unit:

copies data in the second volume to the first volume; and resynchronizes and pairs the first volume and the second volume with each other.

* * * * *